United States Patent
Chang

(10) Patent No.: US 10,090,958 B2
(45) Date of Patent: Oct. 2, 2018

(54) HIGH SPEED MMF (MULTI-MODE FIBER) TRANSMISSIONS VIA ORTHOGONAL WAVEFRONTS

(71) Applicant: SPATIAL DIGITAL SYSTEMS, INC., Camarillo, CA (US)

(72) Inventor: Donald C. D. Chang, Thousand Oaks, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 0 days.

(21) Appl. No.: 14/791,556

(22) Filed: Jul. 6, 2015

(65) Prior Publication Data
US 2016/0006532 A1    Jan. 7, 2016

Related U.S. Application Data

(63) Continuation of application No. 13/281,261, filed on Oct. 25, 2011, now Pat. No. 9,100,085.
(Continued)

(51) Int. Cl.
*H04J 14/02* (2006.01)
*H04B 7/185* (2006.01)
(Continued)

(52) U.S. Cl.
CPC .............. *H04J 14/02* (2013.01); *B64C 39/02* (2013.01); *G01S 13/9303* (2013.01);
(Continued)

(58) Field of Classification Search
None
See application file for complete search history.

(56) References Cited

U.S. PATENT DOCUMENTS 4,867,520 A    9/1989   Weidel
5,659,644 A    6/1997   Digiovanni et al.
(Continued)

OTHER PUBLICATIONS

Figueroa, L; Hong, C. S. Huggins, R.W.; Miller, G.E.; Porter, C.R.; Smith, D.K.; Van Deventer, B."Fiber optics for military aircraft flight systems" LCS, IEEE, vol. 2, No. 1, pp. 52-65; Feb. 1991.
(Continued)

*Primary Examiner* — Darren E Wolf

(57) ABSTRACT

A system is provided for high speed optical fiber data transmission by generating artificial wavefronts along multiple paths exhibiting spatial mutual orthogonality. Multiple independent signal streams are "structured" over a group of different propagation paths that are coherently organized by wavefront multiplexing and de-multiplexing techniques. Therefore, signal streams with enhanced throughput and reliability may be fully recovered at destinations via embedded diagnostic signals and optimization loops. Multiple optical channels are matched with multiple orthogonal wavefronts created by a signal pre-processor. A receiving end signal post-processor dynamically aligns propagation paths via diagnostic signals and orthogonality of the propagation wavefronts electronically. The multiple optical channels are coherently bonded into a single virtual channel, thereby increasing data bandwidth while reducing interference and unwanted multi-path effects. The wavefront multiplexing and de-multiplexing functions may be performed in a dedicated signal processor or may reside in a general-purpose microprocessor located in the user terminal.

20 Claims, 14 Drawing Sheets

Related U.S. Application Data

(60) Provisional application No. 61/537,343, filed on Sep. 21, 2011.

(51) Int. Cl.

| | | |
|---|---|---|
| *H04B 7/204* | (2006.01) | |
| *H04B 10/2581* | (2013.01) | |
| *G01S 13/93* | (2006.01) | |
| *H04L 25/03* | (2006.01) | |
| *B64C 39/02* | (2006.01) | |
| *G01S 7/00* | (2006.01) | |

(52) U.S. Cl.
CPC ..... *H04B 7/18502* (2013.01); *H04B 7/18504* (2013.01); *H04B 7/2041* (2013.01); *H04B 10/2581* (2013.01); *H04L 25/03891* (2013.01); *G01S 7/006* (2013.01)

(56) References Cited

U.S. PATENT DOCUMENTS

| | | | |
|---|---|---|---|
| 5,666,447 A | 9/1997 | Chuang et al. | |
| 6,411,414 B1 | 6/2002 | Abate et al. | |
| 6,839,481 B2* | 1/2005 | White | H04B 10/2581 |
| | | | 385/123 |
| 7,194,155 B1 | 3/2007 | Kahn et al. | |
| 7,242,870 B2 | 7/2007 | Guan et al. | |
| 8,395,546 B2 | 3/2013 | Chang | |
| 2003/0202547 A1 | 10/2003 | Fermann et al. | |
| 2007/0281612 A1* | 12/2007 | Benjamin | H04B 7/18515 |
| | | | 455/13.3 |
| 2008/0291864 A1* | 11/2008 | Chang | H04B 7/2041 |
| | | | 370/316 |
| 2010/0021170 A1 | 1/2010 | Lumineau et al. | |
| 2011/0188855 A1 | 8/2011 | Kokubun et al. | |
| 2012/0026937 A1 | 2/2012 | Chang | |
| 2013/0333544 A1 | 12/2013 | Chang | |

OTHER PUBLICATIONS

Mark W. Beranek; "Fiber Optic Interconnect and Optoelectronic Packaging Challenges for Future Generation Avionics" Proc., SPIE 6478, 647809 (2007); DOI: 10.1117/21709761.

Schollman, S.; Xia, S.; Rosenkranz, W.; "Experimental Investigations of Mode Group Diversity Multiplexing on Multimode Fibre;" Optical Fiber Communication Conference, 2006, 2006 National Fiber Optic Engineers Conference; OFC 2006, pp. 3, 5-10; Mar. 10, 2006.

Zhao, X.; Choa, F. S.; "Demonstration of 10-Gb/s Transmissions over a 1.5-km-long Multimode Fiber using Equalization Techniques;" Photonics Technology Letters, IEEE, vol. 14, No. 8, pp. 1187-1189, Aug. 2002.

Koonen, T.; Van Den Boom, H.; Willems, F.; Bergmans, J.; Khoe, G-D; "Mode Group Diversity Multiplexing for Multi-Service In-House Networks using Multimode Polymer Optical Fibre;" on Proceedings Symposium IEEE/LEOS Benelux Chapter, 2002, Amsterdam, pp. 183-186.

Chen, Y.; Lin, Y. W.; Tsao, Y.C.; Lee. C. Y.; "A 2.4-Gsample/sec DVFS FFT Processor for MIMO OFDM Communication Systems," IEEE Journal of Solid-State Circuits, vol. 43, No. 5, May 2008.

Nelson, L.E.; Woodward, S.L.; Foo, S.; Moyer, M.; Yao, D.; O'Sullivan, M.; "100Gb/s Dual_carrier DP-QPSK Performance after WDM Transmission Including 50GHz Wavelegnth Selective Switches;" On Optical Fiber Communication Conference and Exposition (OFC/NFOEC); 2011 and the National Fiber Optic Engineers Conference, Issue Date: Mar. 6-10, 2011.

\* cited by examiner

HIGH SPEED MMF (MULTI-MODE FIBER) TRANSMISSIONS VIA ORTHOGONAL WAVEFRONTS

This application is a continuation of application Ser. No. 13/281,261, filed Oct. 25, 2011, now pending, which claims the benefit of provisional application No. 61/537,343, filed on Sep. 21, 2011.

BACKGROUND OF THE INVENTION

1. Field of the Invention

The present invention relates to techniques for improving the throughput and reliability of optical fiber links by coherently bonding multiple communication channels together. More particularly, the invention relates to techniques for using multiple orthogonal wavefronts propagating concurrently through multiple optical paths in a fiber to provide enhanced communications via increased channel bandwidth. Furthermore, the same techniques can be modified to enhance amplified signal power thus increasing the effective communications range of the optical data communications

2. Description of Related Art

It is well known in the art that increasing the bandwidth and reliability of a communication interface can be achieved by combining, or bonding, two or more sets of interface hardware. An electro-optical (E/O) network interface card on a host processor, for example, may be limited to a certain maximum data rate over an optical fiber. A second E/O network interface card can be added to the host processor, and software running on the host processor can be made to divide up information packets across the two E/O network interface cards such that portions of a message to be transmitted are sent over both E/O network interface cards simultaneously. If each network card operates at its full bandwidth, the combined bandwidth of the entire optical fiber system is effectively doubled. At the receiving end, the two network data streams are received simultaneously, and the receiving processor reassembles the transmitted data message by properly organizing the packets received from each of the two network interface cards.

The channel bonding methods described above are generally applied to hard-wired connections over copper wire or fiber optics because such hard-wired systems provide good isolation between the two or more independent communication channels. Assuming there is a customer need to deliver two signal streams from a source location to a destination through a fiber network. The capacity of a single fiber channel is adequate enough only to have one signal stream delivered, but not wide enough to have both signals streams delivered concurrently. Channel bonding technique combining two optical channels will enable the customer to deliver both signal streams to the destination concurrently. Let us denote the two available optical channels as Channel 1 and Channel 2. The two optical channels feature active optical sources connecting a source location (S) and the destination (D). The two signal streams are denoted as A and B. Conventional channel bonding will use Channel 1 for signal stream A, and
Channel 2 for signal B.

On the other hand, WF muxing will enable two signals streams A and B propagating through the two channels, Channel 1 and Channel 2, more efficiently. WF muxing techniques will use Channel 1 for a linear combination of the signal stream A and the signal stream B while use Channel 2 for a second linear combination of the signal stream A and the signal stream B. Let us choose a set of combinations such that Channel 1 for a signal stream A+B, represented as S1, and
Channel 2 for a signal stream A−B, denoted as S2.

The distribution of the "weightings" of signal stream A between Channels 1 and 2 is represented as a wavefront (WF) vector [1, 1]. Similarly, the distribution of the "weightings" of signal stream B between Channels 1 and 2 is represented as another WF vector [1, −1]. These two WF vectors are mutually orthogonal to one another. However, signal stream A and signal stream B are completely independent. As long as the two propagation channels, Channels 1 and 2, are equalized, the two signal streams will remain orthogonal when arrive at a destination. Thus the signal stream A and the signal stream B can be reconstituted at the destination via $A=(S1+S2)/2$, and $B=(S1-S2)/2$ The present invention relates to techniques for improving the throughput and reliability of optical fiber links by coherently bonding multiple communication channels together. When coherent bonding is applied to data transmission over an optical fiber, there will be many advantages. One obvious advantage of utilizing WF muxing is dynamic resource allocations.

Two optical fiber channels, Channels 1 and 2, feature two 10 W laser sources to deliver two signal streams A and B. Conventional techniques will independently use Channel 1 for signal stream A and Channel 2 for signal stream B. Therefore, the maximum optical power attributed to the two signal streams is limited to 10 W each. On the other hand when a need is arise to dynamically boost up the optical power associated to signal stream A to 15 W while reduce that to signal stream B to less than 5 W, the present invention will be able to deliver the dynamic optical distribution by adjusting the ratio of the input power levels of signal streams A to B to 3-to-1. As a result, 75% of each laser power will be delegated to signal stream A. Signal stream A will have 7.5 W optical powers from the first laser source and concurrently obtain another 7.5 W optical power from the second laser source. Similarly, signal stream B will draw less than 2.5 W optical powers from the first laser source and concurrently another 2.5 W optical power from the second laser source.

WF muxing and demuxing techniques can be applied to multiple parallel optical paths, such as multiple mode group propagations in multimode fibers (MMF), multiple wavelength division multiplexing in singles mode fibers, or multiple fibers. As long as there are parallel propagation paths and/or banks of parallel optical sources, WF muxing/demuxing techniques will become very helpful.

There are two propagation effects which limits optical fiber transmission distances for both single mode and multi-mode fibers. The first one is pure propagation attenuations; which reduce optical signal to noise ratios as the transmission increased. Higher power lasers will overcome the propagation attentions to increase transmission distance. The second limiting category is the dispersion effects, which distort optical pulse shapes or optical waveforms, causing inter-symbol-interference (ISI).

Optical communication systems are designed to deliver an end-to-end bit error rate (BER) that does not exceed a desired value, such as $10^{-12}$. As dispersion increases, a higher ratio of received signal-to-noise ratio (SNR) is needed to achieve the desired BER. The extra SNR may be required to counteract the effects of dispersion. However, increasing laser power does not guarantee better SNR. Adaptive compensations to equalize dispersion caused by propagations differentials appears to be right approaches to increase SNR. There are three different causes for dispersions in fiber optic communications, (1) phase velocity differentials among different spectral components resulting in chromatic dispersion, (2) group velocity differentials over same spectral components concurrently propagating in multi-paths with different transmission modes resulting in modal dispersion, and (3) differences in transmission speed for light components with different polarizations.

SUMMARY OF THE INVENTION

The equipment used for communications over MMF optical fibers is much less expensive than that for single-mode optical fiber. Because of its high capacity and reliability, multi-mode optical fiber generally is used for backbone applications in buildings, airborne platforms, ground/sea based moving platforms. An increasing number of users are taking the benefits of fiber closer to the user by running fiber to the desktop or to the zone. For a high rise building, standards-compliant architectures such as Centralized Cabling and fiber to the telecom enclosure offer users the ability to leverage the distance capabilities of fiber by centralizing electronics in telecommunications rooms, rather than having active electronics on each floor. Higher speed MMF fiber communications can extend the existing market segment or enhancing the transmission and distance limits. Typical current limits are >100 Mbit/s for distances up to 2 km (100BASE-FX), >1 Gbit/s to 220-550 m (1000BASE-SX), and >10 Gbit/s to 300 m (10GBASE-SR).

Over the "short" distances for which MMF optical fibers are deployed, attenuation is negligible, so that dispersion is the primary penalty that needs to be taken into account. Modal dispersion is the dominant form of dispersion in MMF fibers. Modal dispersion limits transmission distance at all data rates, the distance decreasing as the data rate increases. Modal dispersion phenomena in multi-mode fiber feature much more sophisticated than those for single-mode fiber. The set of modes that dominate the transmission varies from sample to sample, depending on the particular fiber used and upon the precise way in which the light is launched into the fiber. The area of the transmitting surface, its exact position with respect to the fiber and the angle of incidence all play important roles.

Through diagnostic signals and adaptive optimization loop with FIR filters, WF muxing/demuxing techniques will autonomously compensate for velocity differentials among various mode group (MG) in a MMF fiber to minimize the Modal dispersion effects and thus improving transmission distance. In addition, the FIR filters will also autonomously compensate for chromatic dispersion in each of the MGs.

The same techniques are applicable to single mode optical fiber communications configurations utilizing multiple paths/multiple optical sources. The multiple paths may be achievable via wavelength division multiplexing (WDM) or dual-polarization-quadrature-phase-shift-keying (DPQPSK) techniques, among others. Through diagnostic signals and adaptive optimization loop with FIR filters, WF muxing/demuxing techniques will autonomously compensate for phase velocity differentials among various spectrum segments in a single mode fiber to minimize the Chromatic dispersion effects and thus improving transmission distance.

MMF fibers exist in many mobile platforms for broadband onboard communications. MMF fibers feature much large mode field diameter and numerical aperture. Therefore, MMF fiber technologies can relax alignment tolerance for high-efficient coupling. It is robust and low-cost. As a result, MMFs are extensively deployed in many airborne and ground mobile platforms. In addition, MMFs can support a larger transport capacity than single-mode fiber, as it guides many modes. Wavelength-division multiplexing (WDM) has been used to extend MMF transmission capacity. This solution, although technically feasible, leads to high cost. To launch individual propagation modes independently requires rather complicated precision mask based on its field distribution and are not practical. When all these modes are excited simultaneously, and dispersion among the modes smears out the data pulses and thus reduces the transport capacity. A good compromise is to selectively excite a group of modes symmetric to the fiber axis of an MMF. Offset tilted beams are used for exciting mode groups individually. By selectively launching a subset of the whole collection of modes, the dispersion is reduced and a substantially larger capacity in an MMF can be sustained. Mode Group Diversity Multiplexing (MGDM) aims at creating independent and parallel communication channels over a single Multimode Fiber (MMF) by exciting several groups of modes. It can significantly improve the capacity of short-reach Multimode Fiber networks.

A system is provided that enhances the throughput and reliability of optical fiber communications by providing orthogonal wavefronts among multiple propagation paths in a fiber. Multiple optical fiber communication channels are matched with multiple orthogonal wavefronts, and the channels are coherently bonded into a single virtual channel, thereby increasing data bandwidth while reducing interference and multi-path effects that can degrade communications. We will illustrate success designs of high speed data transmission in MMF via orthogonal wavefronts for many different applications. Multiple independent signal streams can ride on various WFs over a group of mode-group (MG) propagation paths coherently organized by wavefront (WF) multiplexing (muxing) and de-multiplexing (demuxing) techniques. As a result, these signal streams can be recovered fully at destinations via embedded diagnostics signals and optimization loops.

An embodiment of an optical fiber communication system in accordance with the present invention includes a preprocessor that performs, among other functions, wavefront multiplexing on signal data streams to be sent through multiple optical channels to a destination. The preprocessor is physically attached to E/O network interface cards for an optical fiber. Prior to performing WF multiplexing, the preprocessor divides the communication data to be sent into portions that will be delivered through one of the available optical channels. If the primary objective is to increase the speed of data transfer, the multiple portions will contain little if any overlapping data. If the primary purpose is to provide robustness, any two adjacent portions will contain significant amounts of overlapping data.

At a destination, there are also 4 functional blocks;
(1) an optical mode-group de-multiplexing (MGDM) device to capture modulated lights concurrently from multiple (N) specifically excited propagation MGs in a MMF fiber.
(2) N light de-modulators/detectors to recover N aggregated wfc signal streams, (3) a WF demuxing device implemented by either a N-to-N IFFT or a N-to-N Butler matrix to reconstitute the M slices of signal streams and N-M stream of pilot codes;

(4) a TDM muxing switch; combining M parallel substreams into a high speed data stream.

At the destination, optical receiving equipment recover multiple signal data streams from various Mode-groups in a MMF fiber. By properly adjusting the amplitudes and phases of among the N MGs prior to a WF demuxer, received signals among the N-paths can be made to add coherently. The WF demuxer is configured to process the various signal streams from the N paths with reconstituted data streams and probing signals at its outputs. Since known probing signals are propagating through the same set of MGs as all signal data streams, the amplitude differentials and phase delay differentials among the MGs can therefore be iteratively compensated utilizing the differences among the recovered probing signals from the desired ones as performance indexes in an optimization loop. Performance indexes are always defined as "positive definite." Total cost will be the sum of all performance indexes. When total cost is high in numeral number, the multiple paths from various MGs are far from equalized by the optimization loop. On the other hand, when the current total cost becomes zero or smaller than a small threshold, it indicates that the amplitude and phase differentials among the optical paths with various MGs have been fully equalized.

WF Muxing and Demuxing Processing Techniques and Implementations

The WF muxing/demuxing techniques feature N parallel propagation paths for M propagating waves concurrently from a source location to a destination, where both M and N are integers, and M≤N. Each wave carries a communications signal stream. As a result of WF mux processing, each propagating wave with its signal stream appears in all (N) parallel paths with unique propagating wavefront (WF) to the destination. Furthermore, the same N parallel propagation paths support other signal streams "attached" to various WFs. For N-parallel paths, a WF is a vector in an N-dimensional space. There are N orthogonal WFs in the N-dimensional space. On the other hand, all M signals at same frequency band propagate through parallel paths concurrently. M completely uncorrelated signal streams are aggregated in each path.

Luneburg lens, Butler Matrices, and Pillboxes are analogue multiple beam beam-forming devices and can be used as WF muxers and demuxers. Many digital devices and formulations also function efficiently as WF muxers and demuxers, such as 1-D or 2-D Fast Fourier Transform (FFT), 1-D or 2-D Discrete Fourier Transform (DFT), Discrete Harley Transform (DHT), Hadamard transform, and Discrete Walsh-Hadamard transform.

In order to illustrate the concept of artificial wavefronts in N spatially discrete propagation paths, let us define the following;

(1) inputs to a WF muxing processor or outputs from a WF demuxing processor are referred to as "slices," and (2) outputs from a WF muxing processor or inputs to a WF demuxing processor are referred to as "wavefront components" (wfcs).

As depicted in FIG. 1, a WF muxing device performs a "functional transformation", not in between time-and-frequency domains, but between space-and-wavefront domains. A N-to-N WF muxing processor features N-input ports and N-output ports; the input signals for the mth port are denoted as sm(t), and output signals for the pth port as yp(t).

As result of a 4-to-4 WF muxing, s1 signal stream will appear in y1, y2, y3, and y4 concurrently but with a unique phase distributions among the 4 paths. The s1 stream in y2 is set at 45° (or $\pi/4$) phase-advanced with respect to (wrt) the propagation phase of the same s1 stream in y1. Concurrently, the s1 streams in y3 and y4 are respectively set at 90° (or $2\pi/4$), and 135° (or $3\pi/4$) phase-advanced wrt that in y1 path. The WF that the s1 signal stream attached to is expressed as WF1;

$$WF1=[\exp(j0),\exp(j\pi/4),\exp(j2\pi/4),\exp(j3\pi/4)] \quad (1.1)$$

More precisely, WF1 is associated with the first input port of the 4-to-4 WF Muxing device, and s1(t) data stream happens to be attached to the first port. As a result of the WF muxing process, s1(t) will flow out from the 4 output ports concurrently with a unique propagating phase distribution, the WF vector WF1; which is time invariant.

Similarly the respective WF vectors attached to s2, s3, and the pilot signals stream are WF2, WF3, and WF4, where $$WF2=[\exp(j0),\exp(j3\pi/4),\exp(j6\pi/4),\exp(j9\pi/4)] \quad (1.2)$$

$$WF3=[\exp(j0),\exp(j5\pi/4),\exp(j10\pi/4),\exp(j15\pi/4)] \quad (1.3)$$

$$WF4=[\exp(j0),\exp(j7\pi/4),\exp(j14\pi/4),\exp(j21\pi/4)] \quad (1.4)$$

In addition, we make the following important observations;

(1) The 4 WF vectors are orthogonal to one another;

(2) The attached 4 signals streams are completely independent.

Under an ideal condition in which all parallel optical propagation paths are "identical" from a source location to a destination, these data signals riding on the orthogonal WFs are fully recoverable by a WF demux processing which inherently performs the following "spatial" match filtering operations.

$$s1(t)=[y1,y2,y3,y4]*[\text{conj}(WF1)]^T, \quad (2.1)$$

$$s2(t)=[y1,y2,y3,y4]*[\text{conj}(WF2)]^T, \quad (2.2)$$

$$s3(t)=[y1,y2,y3,y4]*[\text{conj}(WF3)]^T, \quad (2.3)$$

$$ps(t)=[y1,y2,y3,y4]*[\text{conj}(WF4)]^T \quad (2.4)$$

Realistically, non-equal path lengths or propagation speeds in optical fibers will impost two "propagation effects" on these aggregated signals (y1, y2, y3, and y4) after passing through their chosen optical paths individually. The present invention, after signals arrive at a destination, will address the following issues:

(1) associated amplitude variations due to amplifications from active optical sources or optical amplifiers, and attenuations from optical fiber media loss, (2) variations on phase delays;
   a. linear phase slopes across a frequency band occupied by signal data waveforms
      i. attributed to group delays
   b. nonlinear phase slopes across frequency band occupied by signal data waveforms due to "propagation dispersions"
      i. attributed to waveform distortions and spread group delays across wide frequency spectrum.

Even with the dispersion effects, the embedded optimization processing will calibrate and equalize the propagation effects using the built-in diagnostic signals, ps(t), so that the associated WFs vectors at the destination will become orthogonal again to one another before the signal reconstituting process.

DETAILED DESCRIPTION OF THE PREFERRED EMBODIMENT

The current invention provides a system for coherently bonding multiple optical fiber communication channels by generating artificial wavefronts in multiple optical paths that exhibit mutual spatial orthogonality. Multiple independent signal streams are "structured" over a group of different propagation paths coherently organized by wavefront (WF) multiplexing (muxing) and de-multiplexing (demuxing) techniques. In the detailed description that follows, like element numerals are used to indicate like elements appearing in one or more of the figures.

Figure 1:
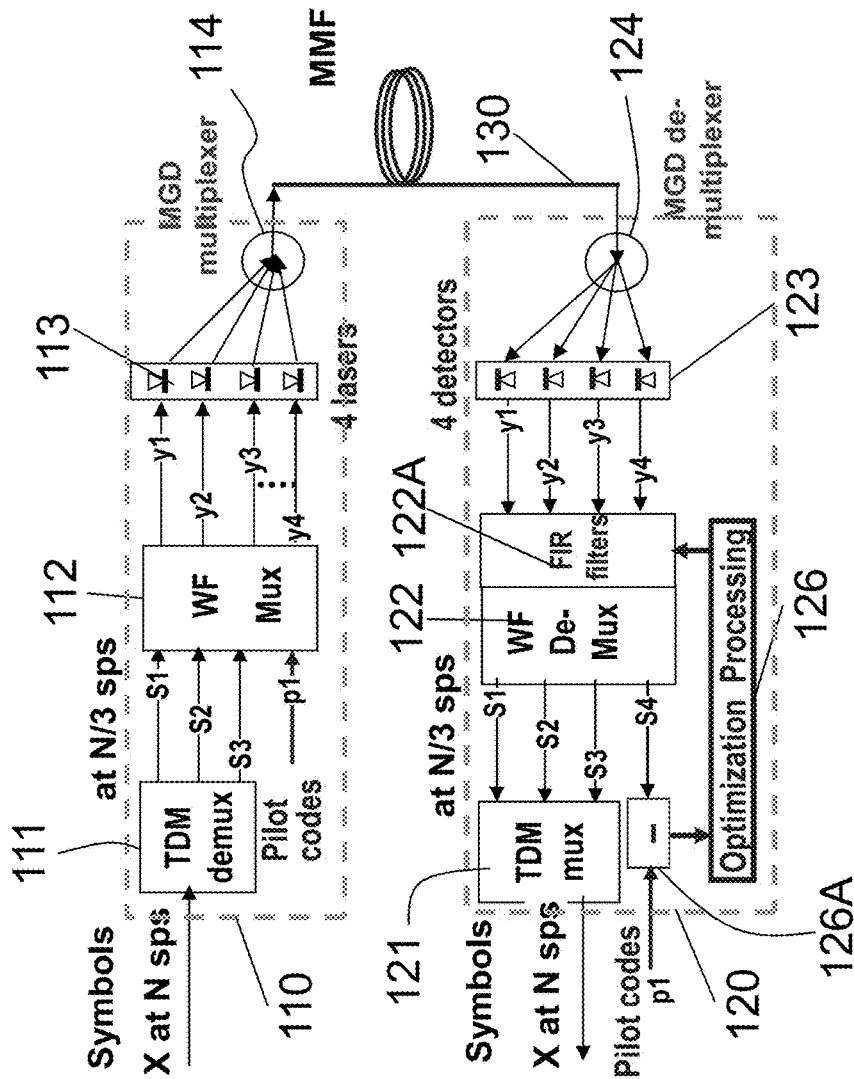
FIG. 1 depicts a block diagram of operation principles of digital data transmissions in a multi-mode fiber (MMF) organized by WF muxing/demuxing techniques.

FIG. 1 illustrates a design concept featuring a multiple-mode-fiber (MMF) with 300% improved transmission capacity via 4 separated mode-groups (MGs) organized by a WF muxing and demuxing processor. It is only for illustrations of a point-to-point design concept and is not an implementation design.

Each MG features a vertical-cavity surface-emitting laser (VCSEL) 113 in transmission site and associated detector 123 on receiving (Rx) site. Four laser lights modulated by digital data streams are multiplexed (muxed) via a mode-group diversity (MGD) multiplexer (muxer) 114. The muxed light signals propagate through a MMF fiber 130. At the destination, a MGD de-multiplexer (demuxer) 124 separates the 4 light signals according to their propagation mode groups.

A wavefront (WF) carrying a signal stream features a fixed propagating phase distributions among a group of (4) parallel MGs; each as an individual propagation path. Multiple orthogonal WFs can carry multiple independent signal streams concurrently from a source point to a destination point through the same group of (4) parallel paths. Concurrent propagations in the forms of orthogonal WF through multiple paths are the unique features used in the design approaches.

A MMF transmissions source location 110 features 4 functional blocks:

(1) a TDM demuxing switch 111 to divide a high speed data stream X flowing at N samples-per-second (sps) into three parallel sub-streams; s1, s2, and s3 referred to as slices flowing at N/3 sps.

(2) a WF muxing device 112 implemented by either a 4-to-4 FFT or a 4-to-4 Butler matrix, with inputs from the 3 slices and a stream of pilot codes;

a. The outputs are various linear combinations of the 4 inputs; s1, s2, s3, and p1. Specifically, y1, y2, y3, and y4 are respectively formulated as:

$$y1(t)=w11*s1(t)+w12*s2(t)+w13*s3(t)+w14*p1(t) \quad (3.1)$$

$$y2(t)=w21*s1(t)+w22*s2(t)+w23*s3(t)+w24*p1(t) \quad (3.2)$$

$$y3(t)=w31*s1(t)+w32*s2(t)+w33*s3(t)+w34*p1(t) \quad (3.3)$$

$$y4(t)=w41*s1(t)+w42*s2(t)+w43*s3(t)+w44*p1(t) \quad (3.4)$$

b. Four wavefront (WF) vectors, each featuring 4 WF components (wfc), are defined.

$$WF1=[w11,w21,w31,w41] \quad (4.1)$$

$$WF2=[w12,w22,w32,w42] \quad (4.2)$$

$$WF3=[w13,w23,w33,w43] \quad (4.3)$$

$$WF4=[w14,w24,w34,w44] \quad (4.4)$$

c. s1(t), s2(t), s3(t), and ps(t) are, respectively, "attached" to 4 WF vectors by connecting to associated input ports of the WF muxing device, d. the outputs y1(t), y2(t), y3(t), and y4(t) are comprised of linear combinations of wavefront components (wfcs); the aggregated data streams.

(3) 4 laser modulators 113 are excited by the 4 aggregated wfc signal streams, and (4) a mode-group diversity multiplexing (MGDM) device 114 fed by the modulated laser lights launching 4 specific propagation mode groups in a MMF fiber 130.

At a destination point 120, there are also 4 functional blocks;

(1) a MG diversity de-multiplexing (MGDM) device 124 to capture modulated lights concurrently from 4 specifically excited propagation MGs in a MMF fiber 130.

(2) 4 light de-modulators/detectors 123 to recover 4 aggregated wfc signal streams, (3) a WF demuxing device 122 implemented by either a 4-to-4 IFFT or a 4-to-4 Butler matrix to reconstitute the 3 slices of signal streams and a stream of pilot codes:

a. The inputs y1', y2', y3', and y4' are connected to a bank of 4 adaptive FIR filters 122A;

a. Individual adaptive filters compensate for phase differentials caused by Chromatic and Modal dispersions among the same MG. There will be significant reductions on waveform shape distortions; minimizing a source for inter-symbol interferences.

b. Differences among 4 FIR filters are optimized as a group to compensate for velocity differentials among propagating MGs via equalization of phase delays 1. weighting coefficients of the FIR filters are optimized by control loops based on recovered pilot signals and an efficient optimization algorithm embedded in the optimization processor 126

2. performance indexes are generated by a cost function generator 126A which utilizing information from both recovered pilot signals and known pilot signals;

3. performance indexes must be positive "definite", and can not be negative values; as a result, the associated cost function generator will feature non-linear relationships between inputs and outputs;

4. the FIR filtered outputs become the inputs to the WF demuxer b. the outputs of the WF demuxer 122 are the 3 slices of desired signal streams and a pilot signal, differences between the recovered pilot signal stream and the original are used as diagnostic observables for optimization processing 126.

(4) a TDM muxing switch 121, combining three parallel sub-streams, the reconstituted s1, s2, and s3 slices, into a high speed data stream X flowing at N sps.

Figure 1A:
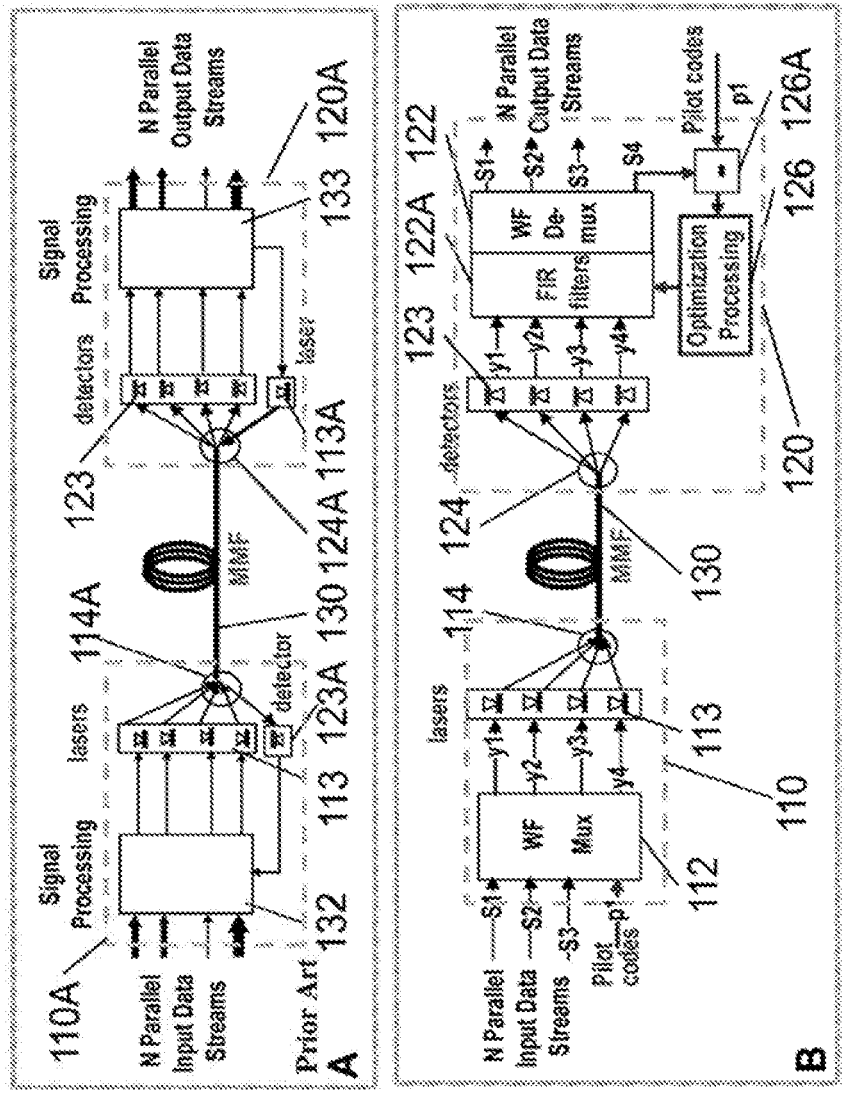
FIG. 1A illustrates two potential architectures for "channel bonding" using multiple mode-groups (MG) and arrays of optical sources. Panel A depicts a conventional approach proposed in literature [r1]. Panel B illustrates operational principles via WF muxing/demuxing techniques.

FIG. 1A depicts two design concepts for channel bonding in MMF optical fibers; the upper panel (a) illustrating a conventional channel bonding techniques using 4 MGs in a MMF fiber connecting a source 110A and a destination 120A and (b) showing a WF muxing/demuxing technique identical to the one in FIG. 1. The purpose of this figure is to make a comparison between a channel bonding technique by conventional techniques and that by WF muxing/demuxing.

Figure 4:
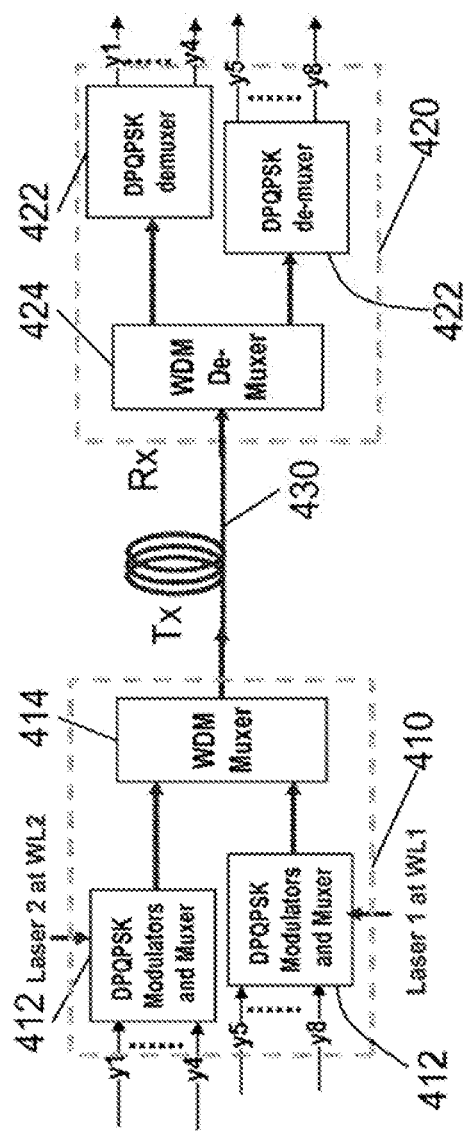
FIG. 4 depicts a block diagram of an embodiment of conventional channel bonding via wavelength division multiplexing (WDM) technique and dual-polarization quadrature-phase-shift-key (DPQPSK) modulators. Each DPQPSK modulator features one laser source, able to support up to 4 high speed digital data streams, each at 25 Gbps throughput. 8 total channels allow 25G of data through the fiber. Total throughput of the fiber is 200 Gbps.

As shown in the upper panel of FIG. 1A, 4 mode groups may be launched by 4 vertical-cavity surface-emitting lasers (VCSEL) 113 at the transmitting end or the source site 110A, and associated detector 123 on receiving (Rx) site 120A will detects the light signals transmitted by the four lasers. Four laser lights modulated by digital data streams are multiplexed (muxed) via a mode-group diversity (MGD) multiplexer (muxer) in a bidirectional muxing/demuxing assembly 114A. The assembly 114A provides 4 optical transmitting channels and a separated optical receiving channel supporting a feed back detector 123A.

The muxed light signals propagate through a MMF fiber 130. At the destination or a receiving site 120A, a MGD de-multiplexer (demuxer) in a bidirectional muxing/demuxing assembly 124A separates the 4 light signals according to their propagation mode groups. The assembly 124A provides 4 receiving channels and a separated transmitting channel supporting a feed back optical source 113A. The output signal from each detector 123 is made up of a certain mixture of the mode groups, caused by the mode mixing in the MMF fiber 130. Electrical signal processing 133 can be used to unravel the mixture, yielding the separate data streams again.

Figure 2:
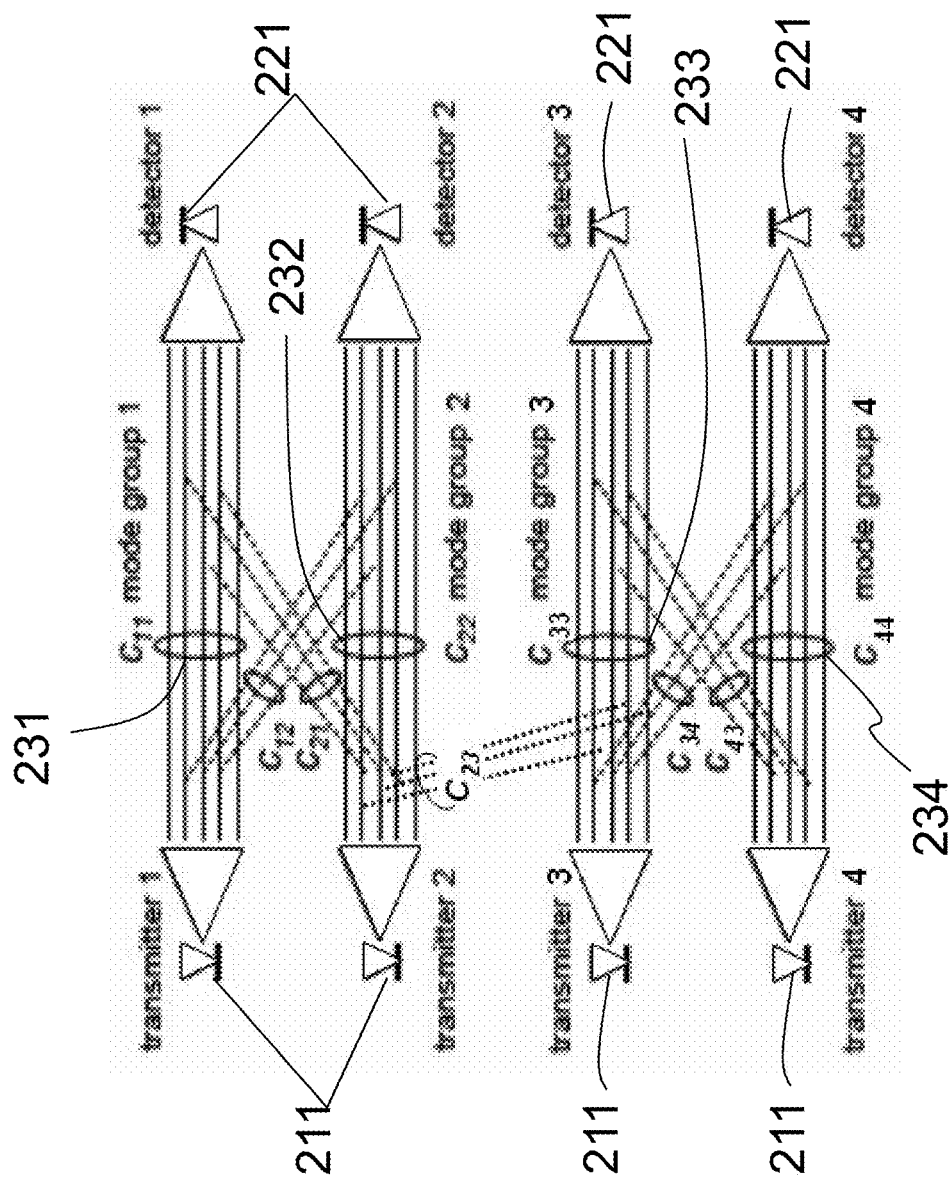
FIG. 2 is a mathematical formulation modeling transfer function (for N=M=4) of a MMF fiber optical system. Leakages to, or coupling from, other mode groups block are indicated by the coupling coefficients.

Mathematically speaking, the transfer of the transmitter inputs of the 4 lasers 113 to the 4 outputs of the 4 detectors 123 is characterized by an 4×4 transfer matrix, depicted in FIG. 2, of which the matrix elements c(n,m) indicate the coupling of transmitting light from laser n to detector m. These coupling coefficients are slow varying for stationary MMF fibers. The slow varying are due to aging of electronics and non-perfect dimensional stability due to variation of operational temperatures and temperature gradients in the MMF fibers. The signal processor 133 at the destination actually takes advantage of the slow varying natures in the coupling coefficients and uses the inverted transfer matrix to unravel the data streams via the following steps:

1. to measure the coupling coefficients in the transfer matrix and to store them in the signal processor 133 at the destination.
   a. The signal processor 133 at the destination will command the signal processor 132 at the transmitter site to send a set of training data sequences via the feedback channel comprising of a laser transmitter 113A, and an associated detector 123A,
      The training sequences are known a priori between the two signal processors 132 and 133, and are used to determine the coupling coefficients in the transfer matrix.
2. Subsequently, the signal processor 132 at the transmitter encodes the data with error correction redundancies to be sent,
   a. the redundancy added can be utilized by the receiver to detect errors.
   b. These errors may have risen due to changes in the coupling coefficients as a result of dynamic mode mixing process in the MMF fiber 130.
   c. The error monitoring data is used to update the coupling coefficients stored in the signal processor 133 at the destination.
3. When too many errors are occurring, the receiver site may ask via a feedback channel to the transmitter to send again a new training data sequence for a new system initialization.

The system depicted on the lower panel in FIG. 1A also feature a multiple-mode-fiber (MMF) 130 with a transmission capacity to support three independent data streams via 4 separated mode-groups (MGs) organized by WF muxing and demuxing processors 112 and 122. Each MG features a vertical-cavity surface-emitting laser (VCSEL) 113 in transmission site and associated detector 123 on receiving (Rx) site. Four laser lights 113 modulated by digital data streams are multiplexed (muxed) via a mode-group diversity (MGD) multiplexer (muxer) 114. The muxed light signals propagate through a MMF fiber 130. At the destination, a MGD de-multiplexer (demuxer) 124 separates the 4 light signals according to their propagation mode groups.

A wavefront (WF) carrying a signal stream features a fixed propagating phase distributions among a group of (4) parallel MGs; each as an individual propagation path. Multiple orthogonal WFs can carry multiple independent signal streams concurrently from a source point to a destination point through the same group of (4) parallel paths. Concurrent propagations in the forms of orthogonal WF through multiple paths are the unique features used in the design approaches.

A MMF transmissions source location 110 features 3 functional blocks:
1. a WF muxing device 112 implemented by either a 4-to-4 FFT or a 4-to-4 Butler matrix, with inputs from the 3 slices, s1, s2, and s3, and a stream of pilot codes p1;
   a. The outputs are various linear combinations of the 4 inputs; s1, s2, s3, and p1. Specifically, y1, y2, y3, and y4 are respectively formulated as in Equations (3.1), (3.2), (3.3), and (3.4).
   b. Four wavefront (WF) vectors, each featuring 4 WF components (wfc), are defined in equations (4.1), (4.2), (4.3), and (4.4) as WF1, WF2, WF3, and WF4 respectively.
   c. s1(t), s2(t), s3(t), and ps(t) are, respectively, "attached" to 4 WF vectors by connecting to associated input ports of the WF muxing device,
   d. the outputs y1 (t), y2(t), y3(t), and y4(t) are comprised of linear combinations of wavefront components (wfcs); the aggregated data streams.
2. 4 laser modulators 113 are excited by the 4 aggregated wfc signal streams, and
3. a mode-group diversity multiplexing (MGDM) device 114 fed by the modulated laser lights launching 4 specific propagation mode groups in a MMF fiber 130.

At a destination point 120, there are also 3 functional blocks:
1. a MG diversity de-multiplexing (MGDM) device 124 to capture modulated lights concurrently from 4 specifically excited propagation MGs in a MMF fiber 130.
2. 4 light de-modulators/detectors 123 to recover 4 aggregated wfc signal streams,
3. a WF demuxing device 122 implemented by either a 4-to-4 IFFT or a 4-to-4 Butler matrix to reconstitute the 3 slices of signal streams and a stream of pilot codes;
   a. The inputs y1', y2', y3', and y4' are connected to a bank of 4 adaptive FIR filters 122A;
   b. Individual adaptive filters compensate for phase differentials caused by Chromatic and Modal dispersions among the same MG. There will be significant reductions on waveform shape distortions; minimizing a source for inter-symbol interferences.
   c. Differences among 4 FIR filters are optimized as a group to compensate for velocity differentials among propagating MGs via equalization of phase delays.
   d. weighting coefficients of the FIR filters are optimized by control loops based on recovered pilot signals and an efficient optimization algorithm embedded in the optimization processor 126,
   e. performance indexes are generated by a cost function generator 126A which utilizing information from both recovered pilot signals and known pilot signals;
   f. performance indexes must be positive "definite", and can not be negative values; as a result, the associated cost function generator will feature non-linear relationships between inputs and outputs;
      the FIR filtered outputs become the inputs to the WF demuxer
   g. the outputs of the WF demuxer 122 are the 3 slices of desired signal streams and a pilot signal,
      differences between the recovered pilot signal stream and the original are used as diagnostic observables for optimization processing 126.

The proposed WF muxing/demuxing techniques for MMF via MGDM differentiates themselves from conventional MGDM techniques with following features:
a. the propagating signals in individual mode-groups (MGs) are
   not the individual signal streams,
   but the aggregated wavefront components of all signal streams;
b. each signal stream appears not just in a MG, but in all MGs with unique propagating phase pattern (wavefront vector);
c. a feed-forward calibration and equalization process for propagation paths diagnostics via embedded pilot code propagating via reserved WFs, coherent re-constitution of input signals at receiving site only based on local diagnostic measurements and optimization algorithms.

Figure 1B:
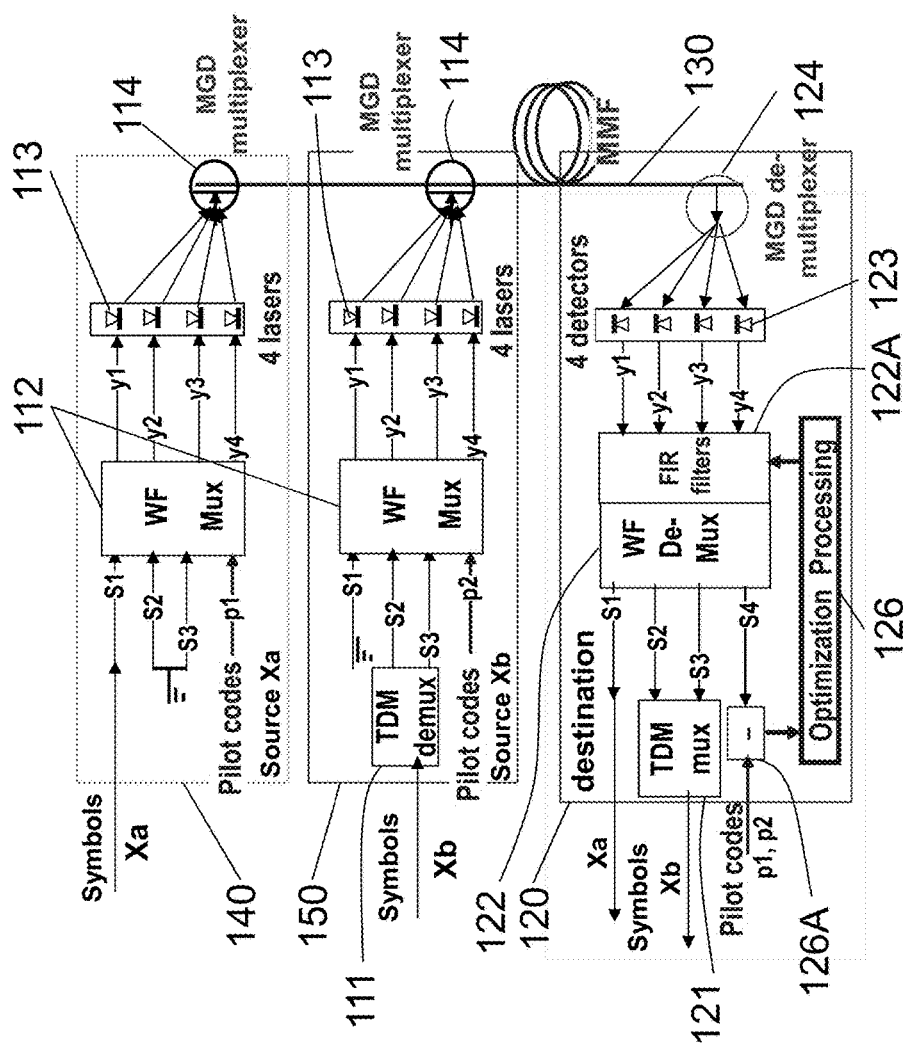
FIG. 1B is a block diagram of operational concepts where multiple users are at different locations, utilizing orthogonal wavefronts to transfer various digital data through the same MMF optical fiber.

FIG. 1B illustrates a design concept for point-to-multipoint digital transmissions via a single MMF fiber organized by WF muxing/demuxing schemes. By using individual orthogonal WFs among multiple MGs instead of separate MGs in a MMF fiber, independent communication channels can be established in a single fiber infrastructure. Thus multiple services can be integrated in one versatile onboard infrastructure, offering the same functionality as WDM but at lower costs provided the electrical signal processing and the arrayed optical sources and detectors can be realized cheaply.

FIG. 1B illustrates a "2-to-1 point" design concept. There are two transmit or source sites 140 and 150, featuring different data rates and one receiving or destination site 120. Both source sites 140 and 150 featuring there own optical transmitting equipments, similar to the optical equipment of the source site 110 in FIG. 1. Each MG features a vertical-cavity surface-emitting laser (VCSEL) 113 in transmission site and associated detector 123 on receiving (Rx) site. Four laser lights modulated by digital data streams are multiplexed (muxed) via a mode-group diversity (MGD) multiplexer (muxer) 114. The muxed light signals propagate through a MMF fiber 130. It is important to point out that the two source sites 140 and 150 may use the same 4 mode groups, completely different groups, or combinations of above. For the sake of simplicity we assume that the first source site 140 and the second source site 150 utilize identical four mode groups of the MMF fiber 130. At the destination, a MGD de-multiplexer (demuxer) 124 separates the light signals according to the propagation mode groups.

A wavefront (WF) carrying a signal stream features a fixed propagating phase distributions among a group of (4) parallel MGs; each as an individual propagation path. Multiple orthogonal WFs can carry multiple independent signal streams concurrently from a source point to a destination point through the same group of (4) parallel paths. Concurrent propagations in the forms of orthogonal WF through multiple paths are the unique features used in the design approaches.

The first MMF source site 140 features 3 functional blocks:
(1) a WF muxing device 112 implemented by either a 4-to-4 FFT or a 4-to-4 Butler matrix, with inputs from the 3 slices and a stream of pilot codes;
   a. The outputs are various linear combinations of the 4 input; s1, s2, s3, and p1 with a constraints that s2 and s3 are grounded. Specifically, y1, y2, y3, and y4 are respectively formulated as in Equations (3.1), (3.2), (3.3), and (3.4).
   b. Four wavefront (WF) vectors, each featuring 4 WF components (wfc), are defined in equations (4.1), (4.2), (4.3), and (4.4) as WF1, WF2, WF3, and WF4 respectively.
   c. s1(t) and p1(t) are, respectively, "attached" to 2 WF vectors by connecting to associated input ports of the WF muxing device; WF2 and WF3 are not used by any signals in the first source site 140.
   d. the outputs y1(t), y2(t), y3(t), and y4(t) are linear combinations of wavefront components (wfcs); the aggregated data streams.
(2) 4 laser modulators 113 are excited by the 4 aggregated wfc signal streams, and
(3) a mode-group diversity multiplexing (MGDM) device 114 fed by the modulated laser lights launching 4 specific propagation mode groups in a MMF fiber 130.

The second MMF source location 150 features 4 functional blocks:
(1) a TDM demuxing switch 111 to divide a high speed data stream Xb flowing at 2Na samples-per-second (sps) into two parallel sub-streams; s2, and s3 referred to as slices flowing at Na sps.
(2) a WF muxing device 112 implemented by either a 4-to-4 FFT or a 4-to-4 Butler matrix, with inputs from the 3 slices and a stream of pilot codes;
   a. The outputs are various linear combinations of the 4 inputs; s1, s2, s3, and p2 with a constraints that s1 is set to zero. Specifically, y1, y2, y3, and y4 are respectively formulated as in Equations (3.1), (3.2), (3.3), and (3.4).
   b. Four wavefront (WF) vectors, each featuring 4 WF components (wfc), are defined in equations (4.1), (4.2), (4.3), and (4.4) as WF1, WF2, WF3, and WF4 respectively.
   c. s2(t), s3(t), and p2(t) are, respectively, "attached" to 3 WF vectors by connecting to associated input ports of the WF muxing device; WF1 is not used by any signal in the second source site 150.
   d. the outputs y1(t), y2(t), y3(t), and y4(t) are comprised of linear combinations of wavefront components (wfcs); the aggregated data streams.
(3) 4 laser modulators 113 are excited by the 4 aggregated wfc signal streams, and
(4) a mode-group diversity multiplexing (MGDM) device 114 fed by the modulated laser lights launching 4 specific propagation mode groups in a MMF fiber 130.

At a destination point 120, there are also 4 functional blocks;
(1) a MG diversity de-multiplexing (MGDM) device 124 to capture modulated lights concurrently from 4 specifically excited propagation MGs in a MMF fiber 130.
(2) 4 light de-modulators/detectors 123 to recover 4 aggregated wfc signal streams,
(3) a WF demuxing device 122 implemented by either a 4-to-4 IFFT or a 4-to-4 Butler matrix to reconstitute the 3 slices of signal streams and a stream of pilot codes:
   a. The inputs y1', y2', y3', and y4' are connected to a bank of 4 adaptive FIR filters 122A:
      1. Individual adaptive filters compensate for phase differentials caused by Chromatic and Modal dispersions among the same MG. There will be significant reductions on waveform shape distortions; minimizing a source for inter-symbol interferences.
      2. Delay differentials among 4 propagating MGs are equalized via an optimization process among the 4 FIR filters.
   b. weighting coefficients of the FIR filters are optimized by control loops based on recovered pilot signals and an efficient optimization algorithm embedded in the optimization processor 126
      1. performance indexes are generated by a cost function generator 126A which utilizing information from both recovered pilot signals and known pilot signals;
      2. performance indexes must be positive "definite", and can not be negative values; as a result, the associated cost function generator will feature non-linear relationships between inputs and outputs;

3. the FIR filtered outputs become the inputs to the WF demuxer c. the outputs of the WF demuxer 122 are the 3 slices of desired signal streams and a pilot signal, 1. port 1 output s1 becomes the recovered Xa after the optimization loop 126 fully compensate for all propagation differentials
2. differences between the recovered pilot signal stream and the original are used as diagnostic observables for optimization processing 126.

(4) a TDM muxing switch 121; combining two parallel sub-streams, the reconstituted s1, s2, and s3 slices, into a high speed data stream Xb.

FIG. 2 illustrates a mathematical model in which transfer functions among mode groups (MG) with N laser sources and M detectors in a MMF optical fiber are formulated as a N×M matrix; where N and M are integers, and M≥N. A special case with N=M=4 is illustrated. The complex matrix elements c(n,m) have an amplitude representing the path attenuation, and a phase representing the phase delay of the path (n,m), "coupling" from the nth laser source to the mth optical detector. Random fluctuations in the mode mixing process will yield fluctuations in the complex elements c(n,m). There are 16 matrix elements; 4 of the depicted diagonal elements 231, 232, 233, and 234 representing the main propagation components, and remaining 12 elements representing "leakage coupling" from one MG to another. Each of the main paths is between a laser source 211 and a detector 221. When the optical sources 211 at the transmitter site have a coherence time larger than the differential delay times between the modes, a speckle pattern due to interference between the modes will occur across the area sampled by the detectors 221. The coherence time of the sources may be deliberately reduced by means of e.g. high frequency modulation in order to reduce the contrast of these speckle patterns.

When the matrix elements c(n,m) are "measurable" for the conventional approach in FIG. 1A, the signal processor 133 at the destination uses an inverted transfer matrix to unravel the data streams. On the other hand, the WF demux processing 122 at the receiving site or the destination 120, as depicted in the B panel of FIG. 1A, may use the embedded pilot signals p1 to dynamically and continuously measure the transfer matrix elements and may store them accordingly in a signal processor. Concurrently, the transmitter data with redundancy added can be deployed as part of WF muxing enabling the receiver to detect and correct errors. There are not feedback loops involved between the laser transmitting and receiving sites at all.

Figure 3:
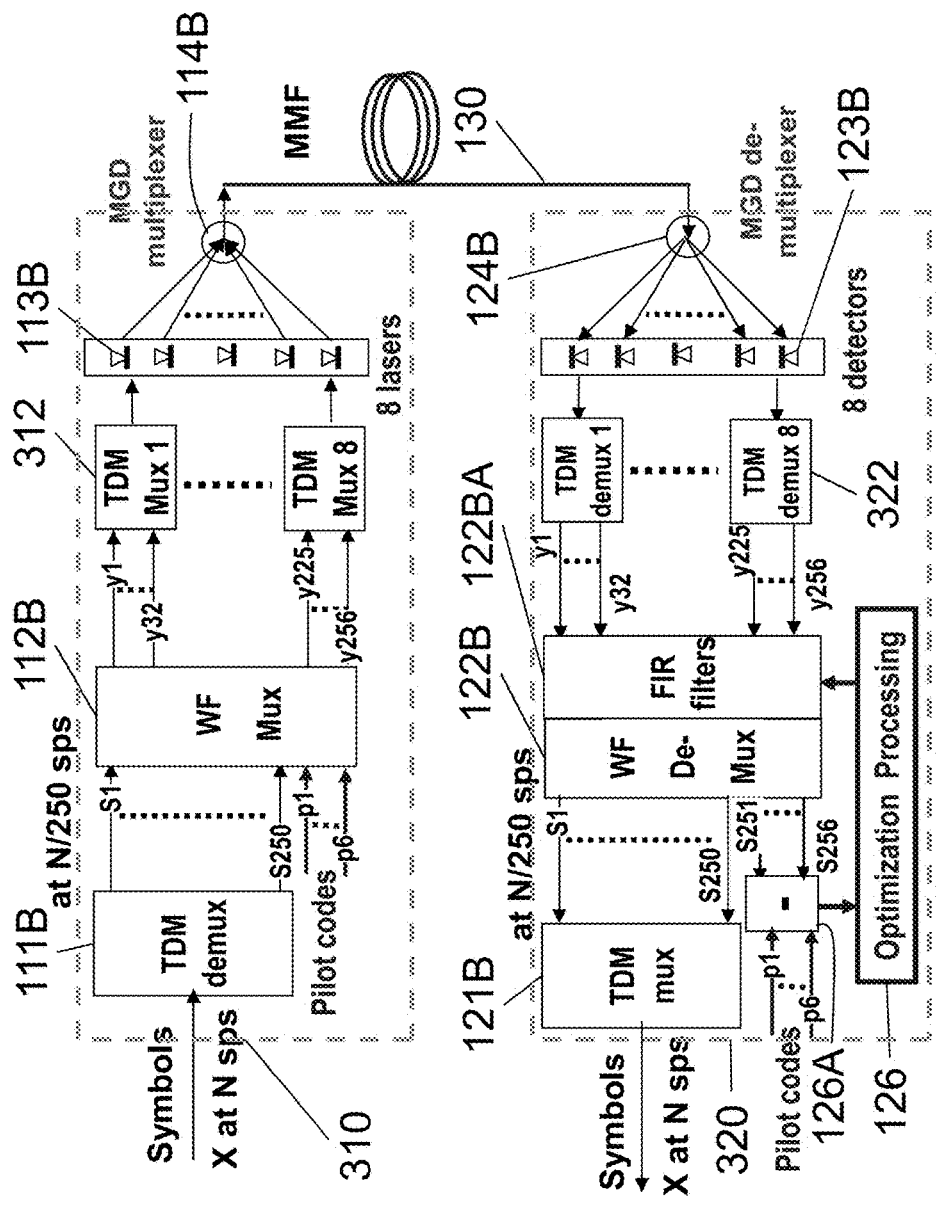
FIG. 3 depicts an operational concept of transmissions in a MMF via 256-to-256 WF muxing/demuxing processors. The entire capacity of the MMF fiber is dedicated to one user.

The proposed point-to-point design depicted in FIG. 3 takes advantage of commercially available high speed and large I/O FFT and IFFT chip sets [9, 10] to implement WF muxing and demuxing functions. The block diagram depicts an 8-MG design concepts using chip sets for 256-point FFT 112B and for 256-point IFFT 122B for a point-to-point high speed data transmission. The propagation bandwidth reserved for pilot signals becomes less than 2.5%, while that for the design depicted in FIG. 1 is 25% of the total available propagating bandwidth. On the other hand the "laser power assets" spent on the pilot signal streams are flexible for both design concepts and shall be designed to feature much less than 1%.

The source or the transmitting site 310 features 5 cascaded building blocks; a 1-to 250 TDM demuxer 111B, a 256-to-256 WF mux 112B, 8 32-to-1 TDM muxers 312, an 8-laser array 113B, and a MGDM exciter 114B. The TDM demuxer 111B divides a high speed data stream into 250 parallel low speed substreams. The WF muxing processor 112B using a 256 point FFT generates 256 orthogonal WFs. The inputs are referred to as slices; 250 of them are from data signal substreams while the remaining 6 are reserved for pilot code signal streams; p1 to p6. Each slice of signals will propagate though all 256 parallel paths, grouped into 8 groups, time division multiplexed before assigned to various MGs. These WFs are distributed in different MGs and time slots but with a prescribed propagating phase relationship as a WF vector at the source. These relationships are inherent outcomes from the WF muxing processor 112B.

It is important to note that 6 of 256 the inputs, slices, of the WF muxer 112B have been chosen for diagnostics in this design concept. In practice, at least one of the slices of the WF muxer 112B must be reserved for diagnostic signals embedded for equalization on multiple paths at receiving ends. The reserved resource dedicated to the diagnostic/equalizations may even be a partial portion of a single slice implemented in time, frequency, or/and code domains. More slices dedicated for diagnostics, the faster the optimization processor 126 will perform, generating better results.

The 256 wfc outputs from the WF muxing processor 112B are grouped by 8 32-to-1TDM muxers 312 into 8 parallel wfc data streams propagating at 32 times of the propagation speed of a wfc channel. They are flowing at 12.8% of the original speed of the input data stream X(t). If there were no diagnostic signals, the flow rate would be 12.5% of that of X(t). The extra 0.3% higher speed is the price paid for embedded pilot codes. The 8 TDM muxed wfc data streams concurrently modulate 8 lasers 113B in the modulators, and the modulated laser lights are launched into 8 propagation MGs in a MMF fiber 130 via a mode-group diversity multiplexing (MGDM) device, the MGD multiplexer 114B.

It is observed that the number of the divided groups among the 256 wfcs can be flexible varying from 2, 3, 4 up to 256 depending on how many MGs available in a MMF fiber. The 256 wfcs may not be equally divided. For a MG with less dispersion, more wfc channels may be assigned to it. Furthermore, these lasers may not have equal power levels. Some of the excited MGs may only be used for canceling of multipath effects At a receiving site 320, the processing basically is to undo the functions in the source or transmitting site 310. A mode group diversity de-multiplexing (MGDM) device 124B captures modulated laser lights from the 8 excited propagation mode groups in the MMF fiber 130. The de-modulators/detectors 123B recover the 8 aggregated wfc signal streams, each is then divided into 32 parallel wfc channels a TDM demuxing switch or demuxer 322. Total 256 wavefront components (wfc's) will be cascaded by a bank of 256 adaptive FIR filters before connected to a 256-to-256 IFFT processor 112B served as the WF demuxing device. The outputs of WF demuxing device 112B will be reconstituted 250 slices of signal streams and 6 streams of pilot codes. The 250 slices of data streams are then combined by a 250-to-1 TDM muxing switch 121B or TDM muxer to form the recovered high speed data stream X.

In transmission, the orthogonality among all 256 WF vectors is the key feature. As the signal streams riding on various WFs propagating through the MMF fiber 113, effects on cumulative phases and amplitudes of received signals from various paths are not identical at the destination 320. The WFs associated with 256 slices are distorted, and the orthogonality among them will disappear. The pilot code streams, p1 to p6, as probing signals are designed for various diagnostic purposes for the WF muxer 112B and the demuxer 122B. An optimization processing 126 is designed to restore the orthogonality among the 256 WFs by compensating for the amplitudes and phases distortions among the 256 WF components, or wfc's, via the bank of 256 FIR filters 122BA.

Figure 3A:
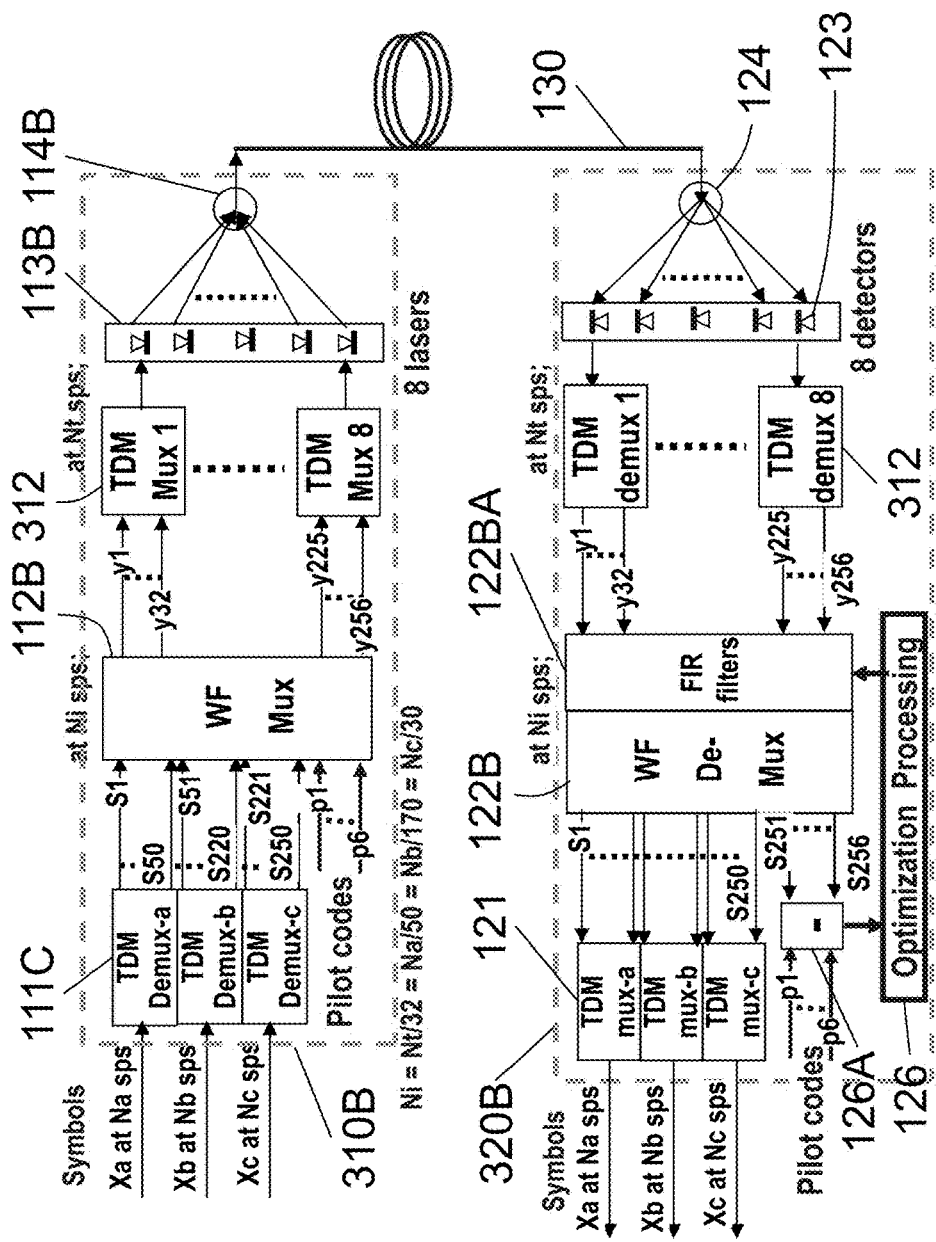
FIG. 3a depicts an operational concept of transmissions in a MMF via 256-to-256 WF muxing/demuxing processors. The entire capacity of the MMF fiber is shared among three users collocated at the fiber head.

FIG. 3A depicts an 8-MG design concept using chip sets for 256-point FFT 112B and for 256-point IFFT 122B for a point-to-point high speed data transmission in a MMF fiber 130 connecting a source site 310A and a destination 320A. However, there are three different users co-located the source site 310A. The channel bandwidth reserved for pilot signals is kept at less than 2.5% level due to the usage of the FFT/IFFT chips. On the other hand the "laser power assets" spent on the pilot signal streams are flexible and shall be kept at a level of less than 1%.

The source or the transmitting site 310A features 5 cascaded building blocks; 3 TDM demuxers 111C, a 256-to-256 WF muxer 112B, 8 32-to-1 TDM muxers 312, a bank of 8 lasers 113B, and a MGDM exciter 114B. There are three different TDM demuxers 111C; a 1-to-50, a 1-to-170, and a 1-25. The three TDM demuxers 111C divide high speed data streams into multiple parallel low speed substreams. The outputs of the three TDM muxers are the 250 substreams; all running at the same clock. The WF muxing processor 112B using a 256 point FFT generates 256 orthogonal WFs. The inputs are referred to as slices; 250 of them are from data signal substreams while the remaining 6 are reserved for pilot code signal streams; p1 to p6. Each slice of signals will propagate though all 256 parallel paths, grouped into 8 groups, time division multiplexed before assigned to various MGs. These WFs are distributed in different MGs and time slots but with a prescribed propagating phase relationship as a WF vector at the source. These relationships are inherent outcomes from the WF muxing processor 112B.

The 256 wfc outputs from the WF muxing processor 112B are grouped by 8 32-to-1TDM muxers 312 into 8 parallel wfc data streams propagating at 32 times of the propagation speed of a wfc channel. They are flowing at 12.8% of the original speed of the input data stream X(t). If there were no diagnostic signals, the flow rate would be 12.5% of that of X(t). The extra 0.3% higher speed is the price paid for embedded pilot codes. The 8 TDM muxed wfc data streams concurrently modulate 8 lasers 113B in the modulators, and the modulated laser lights are launched into 8 propagation MGs in a MMF fiber 130 via a mode-group diversity multiplexing (MGDM) device, the MGD multiplexer 114B.

It is observed that the number of the divided groups among the 256 wfcs can be flexible varying from 2, 3, 4 up to 256 depending on how many MGs available in a MMF fiber. The 256 wfcs may not be equally divided. For a MG with less dispersion, more wfc channels may be assigned to it. Furthermore, these lasers may not have equal power levels. Some of the excited MGs may only be used for canceling of multipath effects.

At a receiving site 320, the processing basically is to undo the functions in the source or transmitting site 310. A mode group diversity de-multiplexing (MGDM) device 124B captures modulated laser lights from the 8 excited propagation mode groups in the MMF fiber 130. The de-modulators/detectors 123B recover the 8 aggregated wfc signal streams, each is then divided into 32 parallel wfc channels a TDM demuxing switch or demuxer 322. Total 256 wavefront components (wfc's) will be cascaded by a bank of 256 adaptive FIR filters before connected to a 256-to-256 IFFT processor 122B served as the WF demuxing device. The outputs of WF demuxing device 112B will be the reconstituted 250 slices of signal streams and 6 streams of pilot codes. The 250 slices of data streams are then grouped and combined by three TDM muxing switches or TDM muxers 121C to recover high speed data streams Xa, Xb, and Xc.

In transmission, the orthogonality among all 256 WF vectors is the key feature. As the signal streams riding on various WFs propagating through the MMF fiber 130, effects on cumulative phases and amplitudes of received signals from various paths are not identical at the destination 320A. As a result, the arriving WFs associated with 256 slices are distorted, and the orthogonality among them will disappear. The pilot code streams, p1 to p6, as probing signals are designed for various diagnostic purposes for the WF muxer 112B and the demuxer 122B. An optimization processing 126 is designed to restore the mutual orthogonality among the 256 WFs by compensating for the amplitudes and phases distortions among the 256 WF components, or wfc's, via the bank of 256 FIR filters 122BA.

Figure 3B:
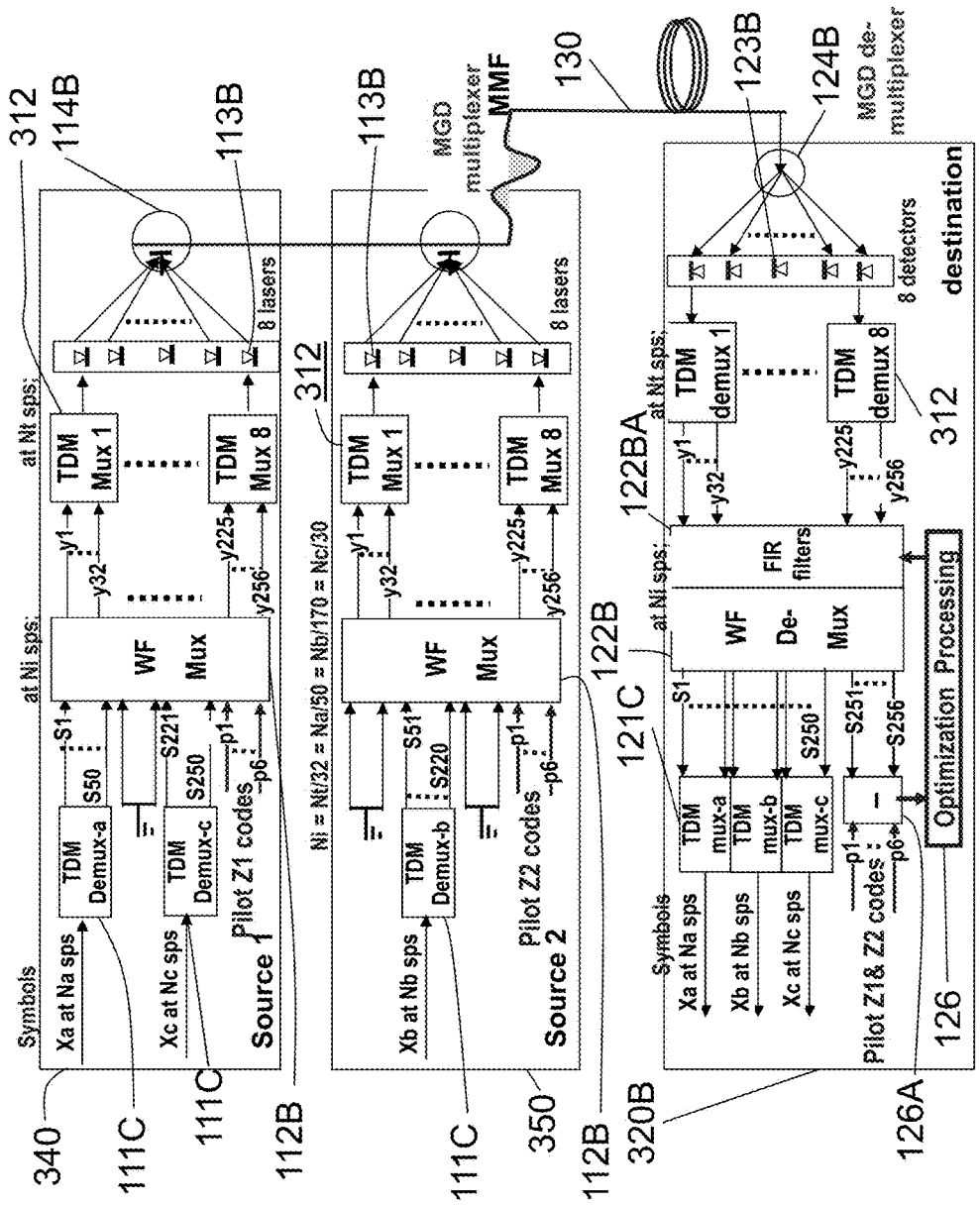
FIG. 3b depicts an operational concept of transmissions in a MMF via 256-to-256 WF muxing/demuxing processors. The entire capacity of the MMF fiber is shared among three users at two different fiber heads.

FIG. 3B depicts a third 8-MG design concept using chip sets for 256-point FFT 112B and for 256-point IFFT 122B for a multipoint-to-point high speed data transmission via a MMF fiber 130 connecting two source sites 340 and 350 and a destination 320B. However, there are three different users located at the two different source sites 340 and 350. The channel bandwidth reserved for pilot signals is kept at less than 2.5% level via high speed FFT/IFFT chip sets. On the other hand the "laser power assets" spent on the pilot signal streams are flexible and shall be kept at a level of less than 1%.

The first source or the transmitting site 340 features 5 cascaded building blocks; 2 TDM demuxers 111C, a 256-to-256 WF muxer 112B, 8 32-to-1 TDM muxers 312, a bank of 8 lasers 113B, and a MGDM exciter 114B. There are two different TDM demuxers 111C; a 1-to-50, and a 1-to-25. The two TDM demuxers 111C divide high speed data streams into multiple parallel low speed substreams. The outputs of the two TDM muxers are among the 75 of the 250 substreams; all running at the same clock. The WF muxing processor 112B using a 256 point FFT generates 256 orthogonal WFs. The inputs are referred to as slices; 250 of them are from data signal substreams while the remaining 6 are reserved for pilot code signal streams; p1 to p6. Each slice of signals will propagate though all 256 parallel paths, grouped into 8 groups, time division multiplexed before assigned to various MGs. These WFs are distributed in different MGs and time slots but with a prescribed propagating phase relationship as a WF vector at the source. These relationships are inherent outcomes from the WF muxing processor 112B.

The second source or the transmitting site 350 also features 5 cascaded building blocks; one TDM demuxer 111C, a 256-to-256 WF muxer 112B, 8 32-to-1 TDM muxers 312, a bank of 8 lasers 113B, and a MGDM exciter 114B. There are two different TDM demuxers 111C; a 1-to-50, and a 1-to-25. The TDM demuxer 111C divide a high speed data stream into 170 parallel low speed substreams. The outputs of the TDM muxer are among the 170 of the 250 substreams; all running at the same clock. The WF muxing processor 112B using a 256 point FFT generates 256 orthogonal WFs. The inputs are referred to as slices; 250 of them are from data signal substreams while the remaining 6 are reserved for pilot code signal streams; p1 to p6. Each slice of signals will propagate though all 256 parallel paths, grouped into 8 groups, time division multiplexed before assigned to various MGs. These WFs are distributed in different MGs and time slots but with a prescribed propagating phase relationship as a WF vector at the source. These relationships are inherent outcomes from the WF muxing processor 112B.

The 256 wfc outputs from the WF muxing processor 112B are grouped by 8 32-to-1TDM muxers 312 into 8 parallel wfc data streams propagating at 32 times of the propagation speed of a wfc channel. They are flowing at 12.8% of the original speed of the input data stream X(t). If there were no diagnostic signals, the flow rate would be 12.5% of that of X(t). The extra 0.3% higher speed is the price paid for embedded pilot codes. The 8 TDM muxed wfc data streams concurrently modulate 8 lasers 113B in the modulators, and the modulated laser lights are launched into 8 propagation MGs in a MMF fiber 130 via a mode-group diversity multiplexing (MGDM) device, the MGD multiplexer 114B.

At a receiving site 320, the processing basically is to undo the functions in the source or transmitting site 310. A mode group diversity de-multiplexing (MGDM) device 124B captures modulated laser lights from the 8 excited propagation mode groups in the MMF fiber 130. The de-modulators/detectors 123B recover the 8 aggregated wfc signal streams, each is then divided into 32 parallel wfc channels a TDM demuxing switch or demuxer 322. Total 256 wavefront components (wfc's) will be cascaded by a bank of 256 adaptive FIR filters 122BA before connected to a 256-to-256 IFFT processor 112B served as the WF demuxing device. The outputs of WF demuxing device 112B will be the reconstituted 250 slices of signal streams and 6 streams of pilot codes. The 250 slices of data streams are then grouped and combined by three TDM muxing switch 121C or TDM muxer to form the recovered high speed data streams Xa, Xb, and Xc.

FIG. 4 depicts a block diagram of an embodiment of a conventional channel bonding via a wavelength division multiplex (WDM) processor or WDM muxer 414 and dual-polarization quadrature-phase-shift-key (DPQPSK) modulators and muxers 412. A source site 410 and a destination 420 for optical data communications are connected by a high speed optical fiber 430. The illustration serves as a referenced design for comparison between a conventional optical channel bonding technique and that by WF muxing/demuxing in single mode fibers.

At the source site 410, there are two DPQPSK modulators/muxers 412 and a 2-to-1 WDM muxer 414. Each DPQPSK modulator/muxer 412, featuring one laser source aggregates 4 channels of high speed 25 Gbps throughput digital data streams into a 100 Gbps high speed optical output. The 2-to-1 WDM muxer 414 multiplexes the two 100 Gbps optical data streams via two different optical wavelengths into one optical bundle before coupling into an optical fiber 430. There are total 8 channels of 25G data through the optical fiber 430. Total throughput of the fiber 430 is 200 Gbps.

At the destination 420, there are a 1-to-2 WDM demuxer 424 and two DPQPSK de-modulators/demuxers 422. The 1-to-2 WDM demuxer 424 de-multiplexes the one optical bundle after coupling from the optical fiber 430 into two 100 Gbps optical data streams based on two different optical wavelengths. Each DPQPSK demodulator/demuxer 422, de-multiplexes a 100 Gbps high speed optical input into 4 channels of high speed 25 Gbps throughput digital data streams. There are total 8 channels of 25G data channels from the two DPQPSK demodulator/demuxer 422.

Figure 4A:
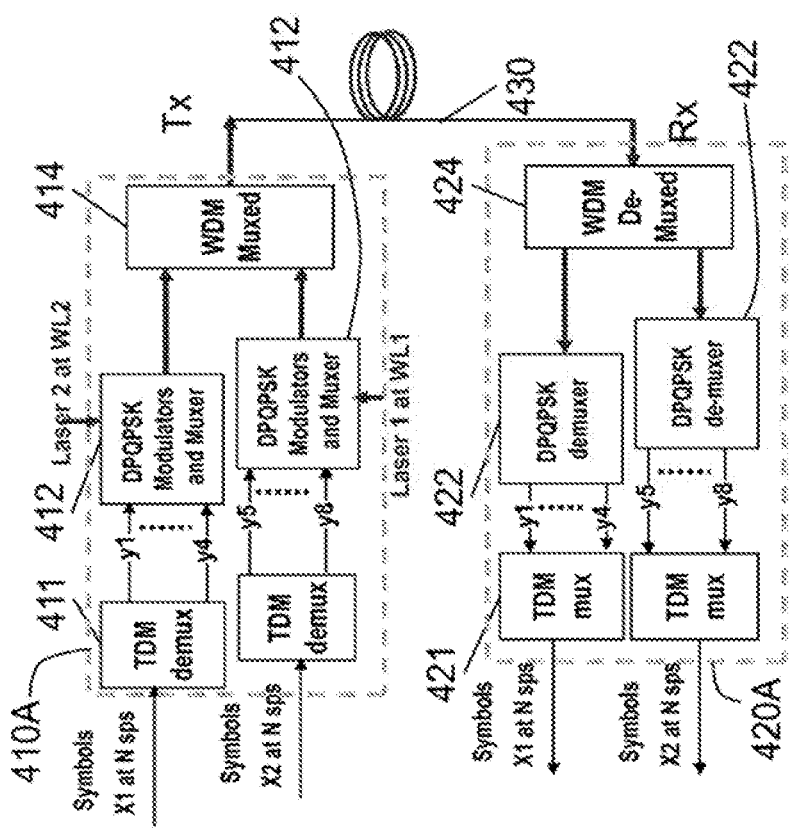
FIG. 4A depicts a block diagram of an embodiment of conventional channel bonding via wavelength division multiplexing (WDM) technique and dual-polarization quadrature-phase-shift-key (DPQPSK) modulators. Each DPQPSK modulator features one laser source, able to support up to 4 high speed digital data streams, each at 25 Gbps throughput. 8 total channels allow 25G of data through the fiber. Total throughput of the fiber is 200 Gbps is dedicated to two unique users.

FIG. 4A depicts a block diagram of an embodiment of a conventional channel bonding via a wavelength division multiplex (WDM) processor or WDM muxer 414 and dual-polarization quadrature-phase-shift-key (DPQPSK) modulators and muxers 412 for two dedicated high speed users. A source site 410A and a destination 420A for optical data communications are connected by a high speed optical fiber 430. The illustration serves as a referenced design for comparison between a conventional optical channel bonding technique and that by WF muxing/demuxing in single mode fibers supporting two 100G users.

At the source site 410A, there are three cascaded functional blocks; two TDM demuxers 411, two DPQPSK modulators/muxers 412, and a 2-to-1 WDM muxer 414. Each of the two 1-to-4 TDM demuxers 411 divides a 100 Gbps data stream into four signal streams each flowing at a rate of 25 Gbps. Each DPQPSK modulator/muxer 412, featuring one laser source aggregates 4 channels of high speed 25 Gbps throughput digital data streams into a 100 Gbps high speed optical output. The 2-to-1 WDM muxer 414 multiplexes the two 100 Gbps optical data streams via two different optical wavelengths into one optical bundle before coupling into an optical fiber 430. There are total 8 channels of 25G data through the optical fiber 430. Total throughput of the fiber 430 is 200 Gbps.

At the destination 420, there are also three functional blocks; a 1-to-2 WDM demuxer 424, two DPQPSK de-modulators/demuxers 422, and two 4-to-1 TDM muxers 421. The 1-to-2 WDM demuxer 424 de-multiplexes the one optical bundle after receiving from the optical fiber 430 into two 100 Gbps optical data streams based on two different optical wavelengths. Each DPQPSK demodulator/demuxer 422 de-multiplexes a 100 Gbps high speed optical input into 4 channels of high speed 25 Gbps throughput digital data streams. The four channel outputs are aggregated by one of the two 4-to-1 TDM muxers supporting 100 Gbps high speed transports. There are total 8 channels of 25G data channels from the two DPQPSK demodulator/demuxer 422, or two 100 G data channels from the two TDM muxers 421.

Figure 5:
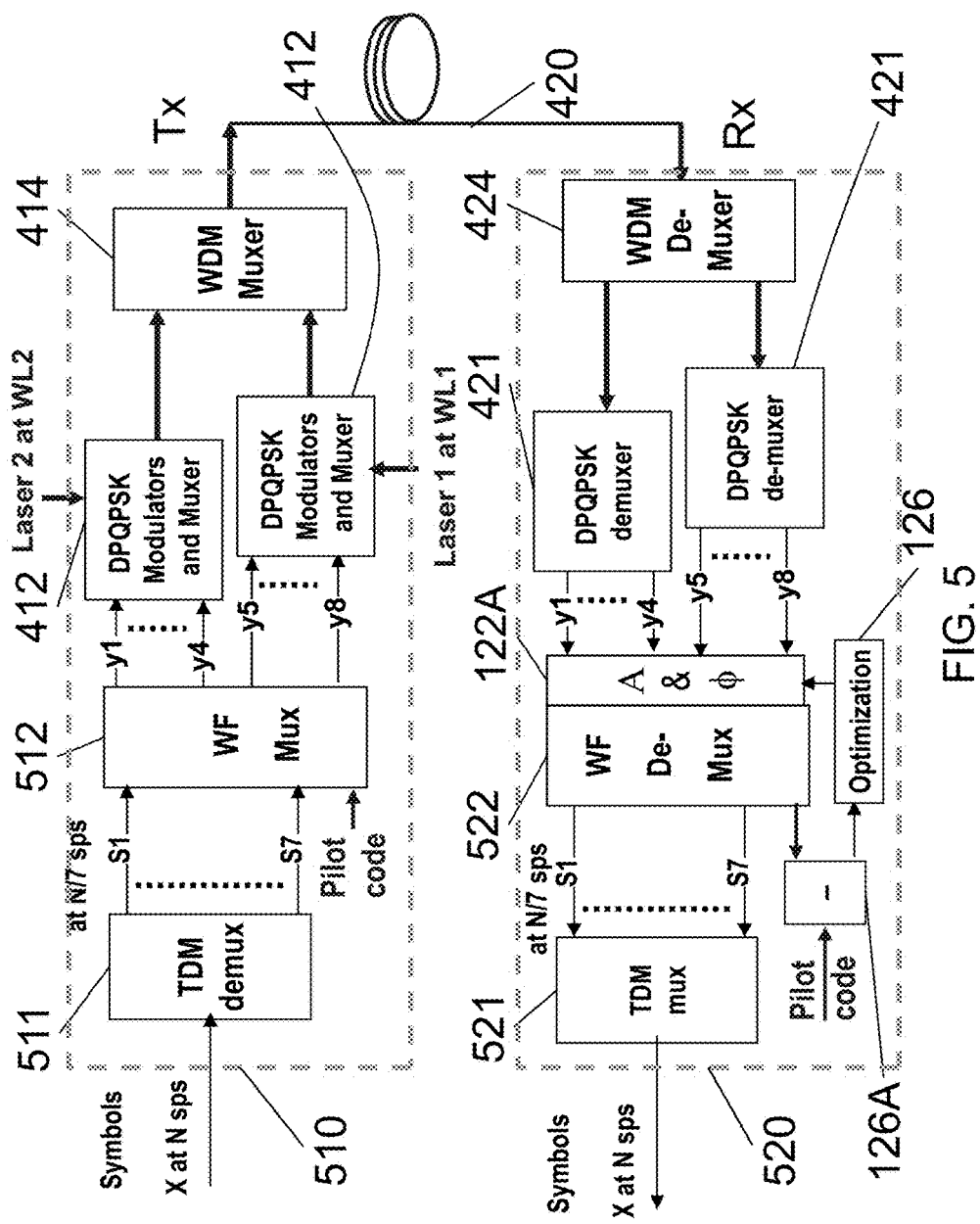
FIG. 5 depicts a block diagram of an embodiment of coherent channel bonding via 8-to-8 wavefront (WF) muxing/demuxing and WDM techniques. DPQPSK modulators are included in the embodiment. Embedded diagnostic signals occupy ⅛ of inputs to the WF muxer, with overhead for WF muxing at about 12.5% of total channel capacity. Each DPQPSK modulator features one laser source that can support up to 4 high speed digital data streams, each at 25 Gbps throughput, supporting 21.875 Gbps data and 3.125 Gbps diagnostic signals. Each of the 8 total channels can support 25 Gb of data (24.5 data and 0.5 diagnostic signals). Total throughput is 200 Gbps, shared between two unique users.

FIG. 5 depicts a block diagram of an embodiment of a coherent channel bonding via WF multiplexing techniques. Digital data communications between a source site 510 and a destination 520 is achieved via optical communication via an optical fiber 430 connecting the source site 510 and a destination 620. At the source site, there are four cascaded functional blocks; A TDM demux 511, an 8-to-8 wavefront (WF) muxer 512, two dual-polarization quadrature-phase-shift-key (DPQPSK) modulators/muxers 412, and a 2-to-1 optical wavelength division multiplex (WDM) processor or WDM muxer 414.

The four functional blocks at the source site 510 are:
1. The 1-to-8 TDM demuxers 511 divides a 175 Gbps data stream into 7 signal streams each flowing at a rate of 25 Gbps.
2. The 8-to-8 WF muxing device 512 implemented by either an 8-to-8 FFT or an 8-to-4 Butler matrix, features
   a. 8 inputs from the 7 signal slices; s1, s2, s3, s4, s5, s6, s7, and a stream of pilot codes; p1.
   b. 8 outputs; y1, y2, y3, y4, y6, y7, and y8;
   c. More specifically, the outputs are various linear combinations of the 8 inputs formulated as following;

$$[Y(t)] = [w][sP(t)] \quad (5)$$

where
   $[y(t)]^T = [y1(t), y2(t), y3(t), y4(t), y5(t), y6(t), y7(t), y8(t)]$,
   [w] is a 8×8 matrix representing 8 orthogonal wavefront vectors and
   $[sp(t)]^T = [s1(t), s2(t), s3(t), s4(t), s5(t), s6(t), s7(t), p1(t)]$.
   Eight wavefront (WF) vectors, each featuring 8 WF components (wfc's).

s1(t), s2(t), s3(t), s4(t), s5(t), s6(t), s7(t), and p1(t) are "attached" to 3 WF vectors, respectively, by connecting to associated input ports of the WF muxing device 511;

WF8 is for diagnostic signal p1(t).

The outputs y1(t), y2(t), y3(t), y4(t), y5(t), y6(t), y7(t), and y8(t) are linear combinations of wavefront components (wfcs); the aggregated data streams.

3. There are two DPQPSK modulator/muxer 412, each featuring one laser source aggregates 4 channels of high speed 25 Gbps throughput digital data streams into a 100 Gbps high speed optical output.

4. The 2-to-1 WDM muxer 414 multiplexes the two 100 Gbps optical data streams via two different optical wavelengths into one optical bundle before coupling into an optical fiber 430. There are total 8 channels of 25G data through the optical fiber 430. Total throughput of the fiber 430 is 200 Gbps.

As a result of embedded diagnostic signals occupying ⅛ of the inputs of the WF muxer, the overhead for WF muxing is about 12.5% of the total channel capacity. Each DPQPSK modulator/muxer 412 features 4 channels of high speed digital data streams; each at 25 Gbps throughput in which 21.875 Gbps capacity supporting real data flow and 3.125 Gbps capacity is dedicated for diagnostic signals. There are total 8 channels of 25G data through an optical fiber 430 connecting a source site 510 and a destination 520. Among the total throughput of 200 Gbps for the fiber 430, 175 Gbps data bits is dedicated to one user, and 25 Gbps is the "overhead" for diagnostic signals At the destination 520, there are also 4 functional blocks;

(1) an optical 1-to-2 wavelength division de-multiplexing device or 1-to-2 WDM demuxer 424 to de-multiplex capture modulated lights in the optical fiber 430.

(2) two DPQPSK de-modulator/demuxer 422 to separate 4 aggregated wfc signal streams, (3) a WF demuxing device 522 implemented by either a 8-to-8 IFFT or a 8-to-8 Butler matrix to reconstitute the 7 slices of signal streams and 1 stream of pilot codes;

Prior to connected to demuxing device 522, the 8 inputs y1', y2', y3', y4', y5', y6', y7', and y8' are connected to a bank of 8 adaptive FIR filters 522A;

1. Individual adaptive filters compensate for phase differentials caused by Chromatic dispersions for optical spectrum near an optical wavelength for a single mode fiber. There will be significant reductions on waveform shape distortions; minimizing a source for inter-symbol interferences.
2. Differences among 8 FIR filters are optimized as a group to compensate for velocity differentials among two propagating wavelength groups via equalization of phase delays,
3. weighting coefficients of the FIR filters are optimized by control loops based on recovered pilot signals and an optimization algorithm embedded in the optimization processor 126,
4. performance indexes are generated by a cost function generator 126A which utilizing information from both recovered pilot signals and known pilot signals;
5. performance indexes must be positive "definite", and can not be negative values; as a result, the associated cost function generator will feature non-linear relationships between inputs and outputs;
    a. Total cost is the summations of all current performance indexes
    b. Generating new FIR coefficients via Cost minimizations used in the optimization loop until the total cost become negligibly small.
    c. Keep the optimization loop running continuously and dynamically
6. the FIR filtered outputs become the inputs to the WF demuxer.

there are 8 outputs from the demuxing device 522, the 7 recovered signals slices, and one reconstituted probing signal stream.

1. The 7 slices of recovered signals become the 7 inputs of sub-stream signals for the following TDM muxer 521;
2. The reconstituted probing signals will be used by the cost generator 126A generating performance indexes dynamically for the optimization processor 126;

(4) a TDM muxing switch; combining 7 parallel substreams into a high speed data stream.

Figure 5A:
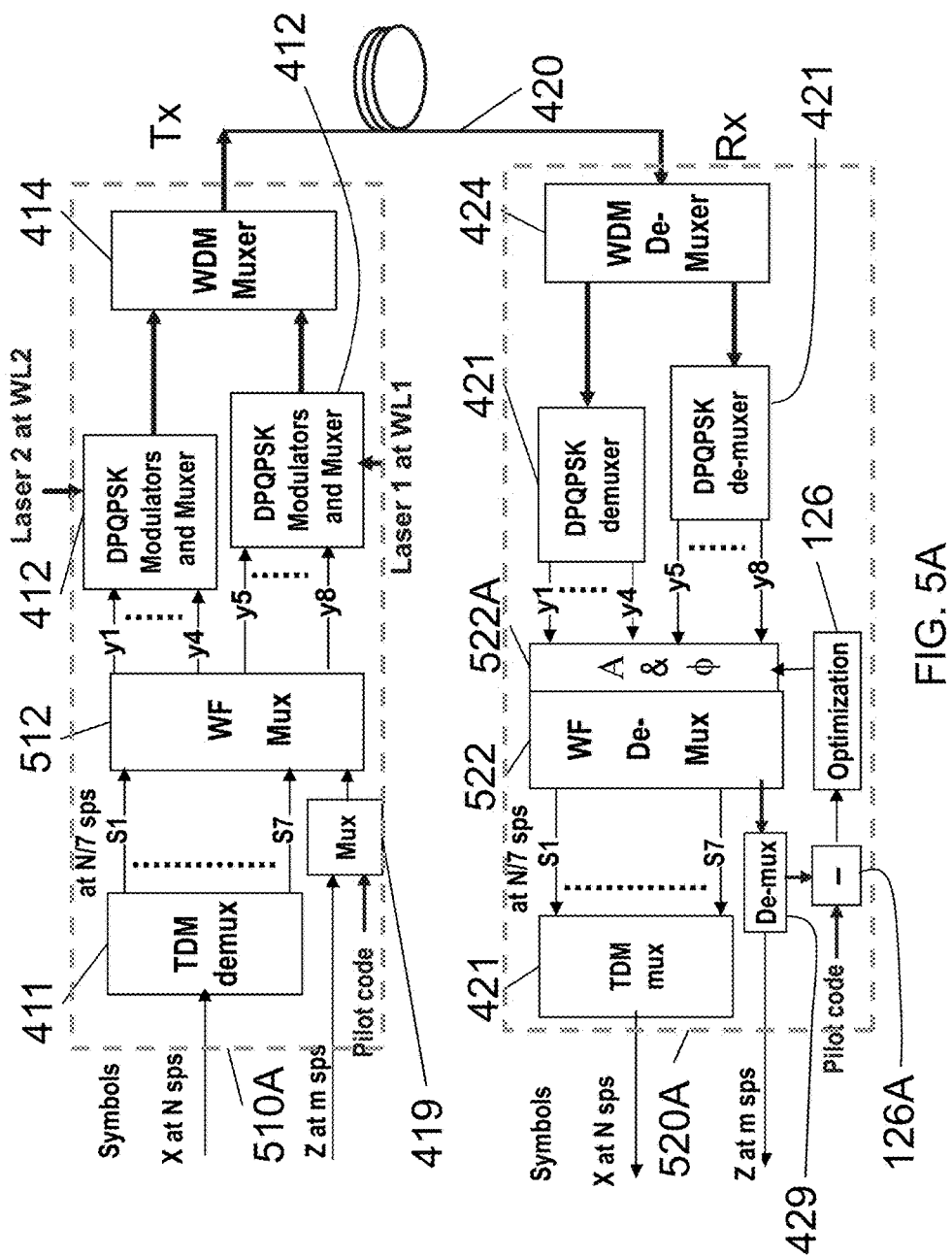
FIG. 5A uses the same diagram as FIG. 5. Calibration overhead is reduced from 12.5% to less than 2%. An 8-to-8 WF muxing/demuxing unit using WDM techniques are depicted, with two DPKPSK modulators present. The input reserved for a diagnostic signal in FIG. 5A is shared by a second user with a data rate ⅛ that of the first user. Therefore, embedded diagnostic signals occupy 1/64 of WF muxer inputs, claiming 1.5265% of total channel capacity. Each DPQPSK modulator features one laser source, supporting up to 4 channels of high speed digital data streams, each at 25 Gbps throughput supporting >24.5 Gbps data and <0.5 Gbps diagnostic signals. There are total 8 channels of 25G data through an optical fiber. Total throughput of the fiber of 200 Gbps, >196 Gbps data bits and <4 Gbps "overhead," is shared among two users.

FIG. 5A depicts the same block diagram as that in FIG. 5 except a scheme of reducing calibration overhead from 12.5% to less than 2%. The embodiment of a coherent channel bonding via WF muxing/demuxing processing in digital data communications is achieved by an optical fiber 430 delivering two signal streams, a X and a Z signal streams, respectively, from a source site 510A to a destination 520A. At the source site 510A, there are four cascaded functional blocks; A TDM demux 511, an 8-to-8 wavefront (WF) muxer 512, two dual-polarization quadrature-phase-shift-key (DPQPSK) modulators/muxers 412, and a 2-to-1 optical wavelength division multiplex (WDM) processor or WDM muxer 414.

At the source site 510A, there are a 1-to 7 TDM demuxer 511, a signal muxer 519, an 8-to-8 wavefront (WF) muxer 512, two dual-polarization-quadrature-phase-shift-key (DPQPSK) modulators/muxers 412, and a 2-to-1 optical wavelength division multiplex (WDM) processor or a 2-to-1 optical WDM muxer. The 1-to-7 TDM demuxer 511 converts the X signal stream into 7 substreams with a data rate flowing at ⅐ of that of the X signal stream. The signal muxer 519 is used to multiplex a Z signal stream with a probing signal stream. The muxed output becomes the $8^{th}$ input of the WF muxer 512.

The input reserved for a diagnostic signal for the WF muxer 512 in FIG. 5 is shared by a second user with a data rate at ⅛ of that of the first user. (i.e. the Z signal stream features a bandwidth which is ⅛ of that of the X signal stream.) As a result, embedded diagnostic signals occupying 1/64 of the inputs of the WF muxer 512, the overhead dedicated for path equalization in the WF muxing is about 1.5625% of the total channel capacity. Each DPQPSK modulator featuring one laser source can support up-to 4 channels of high speed digital data streams; each at 25 Gbps throughput supporting >24.5 Gbps data and <0.5 Gbps diagnostic signals. There are total 8 channels of 25G data through an optical fiber. Total throughput of the fiber of 200 Gbps, >196 Gbps data bits and <4 Gbps "overhead," is shared among two users.

At the destination 520A, there are also 4 functional blocks; (1) an optical 1-to-2 wavelength division de-multiplexing device or 1-to-2 WDM demuxer 424 to de-multiplex capture modulated lights in the optical fiber 430, (2) two DPQPSK de-modulator/demuxer 422 to separate 4 aggregated wfc signal streams, (3) a WF demuxing device 522 implemented by either a 8-to-8 IFFT or a 8-to-8 Butler matrix, and (4) a TDM muxing switch; combining 7 parallel sub-streams into a high speed data stream as the recovered X signal stream.

For the third functional block and prier to be connected to the WF demuxing device 522, the 8 inputs y1', y2', y3', y4', y5', y6', y7', and y8' are connected to a bank of 8 adaptive FIR filters 522A; There are 8 outputs from the WF demuxing device 522A; the 7 recovered signals slices, and a reconstituted multiplexed signal stream consisting of one data signal stream and a low rate probing signal stream. The 7 slices of recovered signals become the 7 inputs of sub-stream signals for the following TDM muxer 521. The reconstituted muxed signals will be demuxed by a signal demuxer 529 into two separated channels:
  i. a signal channel delivering a recovered Z signal stream which features only ⅛ the data rate of that of the X signal stream, and
  ii. a probing channel delivering recovered probing signal streams which only use 1/64 of total channel capacity for diagnostic.
     to be used by the cost generator 126A generating performance indexes dynamically for the optimization processor 126.

Figure 6:
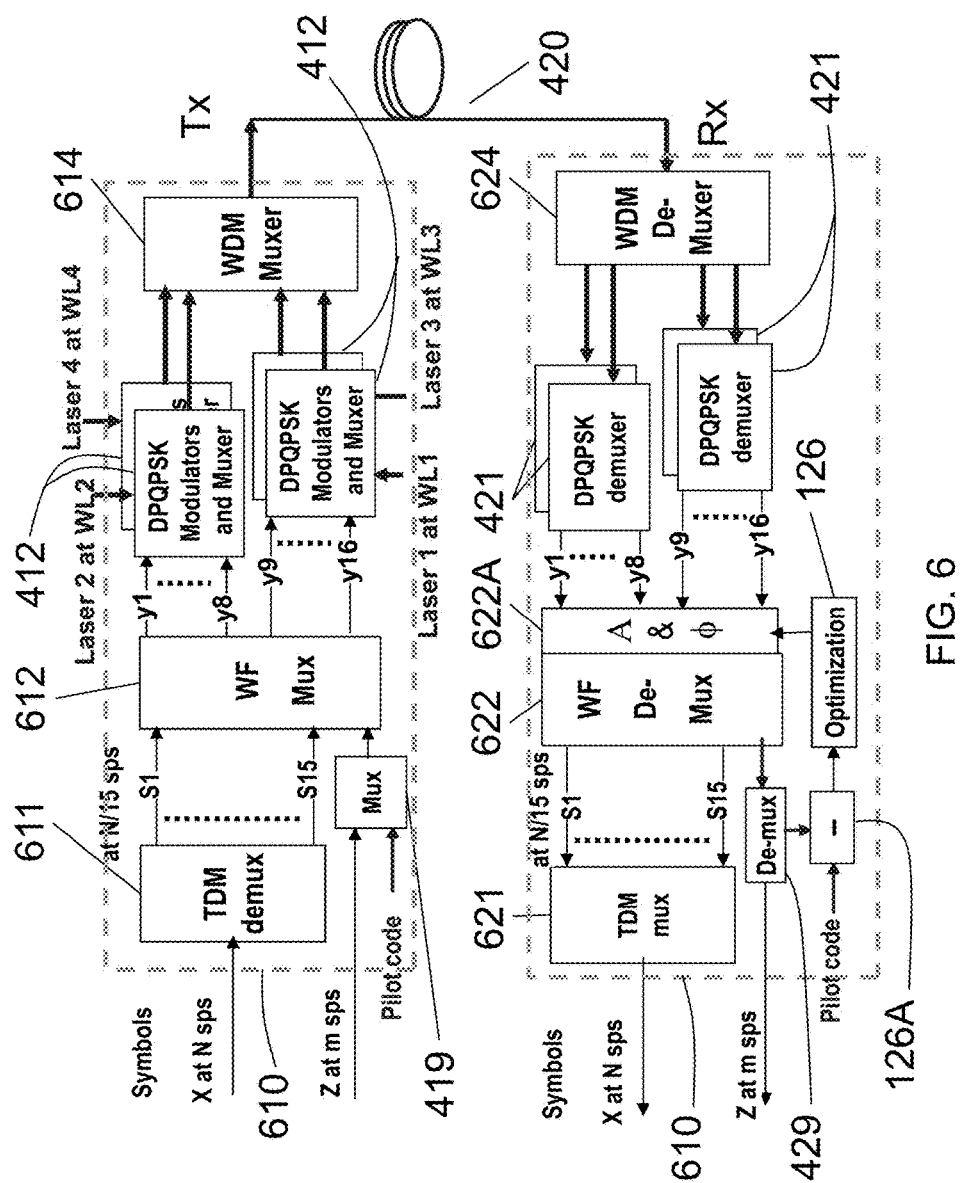
FIG. 6 uses the same diagram as FIG. 5A. Calibration overhead is reduced from 12.5% to less than 2%. An 8-to-8 WF muxing/demuxing unit using WDM techniques are depicted, with four DPQPSK modulators present. The input reserved for a diagnostics in FIG. 5A is shared by a second user with a data rate 1/16 that of the first user. Therefore, embedded diagnostic signals occupy 1/128 of WF muxer inputs, claiming 0.8% of total channel capacity. Each DPQPSK modulator features one laser source, supporting up to 4 channels of high speed digital data streams, each at 25 Gbps throughput. 16 total channels of 25 Gb data allow for a total throughput of 400 Gbps, where 396 Gbps is data and 4 Gbps is overhead, shared between two users.

FIG. 6 depicts a similar block diagram as that in FIG. 5A except a scheme of reducing calibration overhead from 12.5% to less than 1%. The embodiment of a coherent channel bonding in an optical fiber 430 via a 16-to-16 wavefront (WF) muxing/demuxing and a 4-to-1 wavelength division multiplex (WDM) techniques is depicted. The embodiment of a coherent channel bonding via WF muxing/demuxing processing in digital data communications is achieved by an optical fiber 430 delivering two signal streams, a X and a Z signal streams, respectively, from a source site 610 to a destination 620.

At the source site 610, there are a 1-to-15 TDM demuxer 611, a signal muxer 519, an 16-to-16 wavefront (WF) muxer 612, four dual-polarization-quadrature-phase-shift-key (DPQPSK) modulators/muxers 412, and a 4-to-1 optical wavelength division multiplex (WDM) processor or a 4-to-1 optical WDM muxer 614. The 1-to-15 TDM demuxer 611 converts the X signal stream into 15 substreams with a data rate flowing at 1/15 of that of the X signal stream. The signal muxer 519 is used to multiplex a Z signal stream with a probing signal stream. The muxed output becomes the 16$^{th}$ input of the WF muxer 612.

The input used to reserved only for a diagnostic signal for the WF muxer 612 is shared by a second user with a data rate at 1/16 of that of the first user. (i.e. the Z signal stream features a bandwidth which is 1/16 of that of the X signal stream.) As a result, embedded diagnostic signals occupying 1/128 of the communications resources of the WF muxer 612, the overhead dedicated for path equalization in the WF muxing is about 1.5625% of the total channel capacity. Each DPQPSK modulator featuring one laser source can support up-to 4 channels of high speed digital data streams; each at 25 Gbps throughput supporting >24.5 Gbps data and <0.5 Gbps diagnostic signals. There are total 16 channels of 25G data through an optical fiber. Total throughput of the fiber 430 is about 400 Gbps, or >a capability of delivering 396 Gbps data using a resource <4 Gbps as an "overhead."

At the destination 620, there are also 4 functional blocks; (1) an optical 1-to-2 wavelength division de-multiplexing device or 1-to-4 WDM demuxer 624 to de-multiplex capture modulated lights in the optical fiber 430, (2) four DPQPSK de-modulator/demuxer 422; each to separate 4 aggregated wfc signal streams, (3) a 16-to-16 WF demuxing device 622 implemented by either a 16-to-16 IFFT or a 16-to-16 Butler matrix, and (4) a TDM muxing switch; combining 15 parallel sub-streams into a high speed data stream as the recovered X signal stream.

For the third functional block and prier to be connected to the WF demuxing device 522, there are 16 inputs connected to a bank of 16 adaptive FIR filters 622A; There are 16 outputs from the WF demuxing device 622, the 15 recovered signals slices, and a reconstituted multiplexed signal stream with one data channel and a low rate probing signal stream. The 15 slices of recovered signals become the 15 inputs of sub-stream signals for the following TDM muxer 521. The reconstituted muxed signals will be demuxed by a signal demuxer 529 into two separated channels:
  i. a signal channel delivering a recovered Z signal stream which features only 1/16 the data rate of that of the X signal stream, and
  ii. a probing channel delivering recovered probing signal streams which only use 1/128 of total channel capacity for diagnostic.
     to be used by the cost generator 126A generating performance indexes dynamically for the optimization processor 126.

Figure 7:
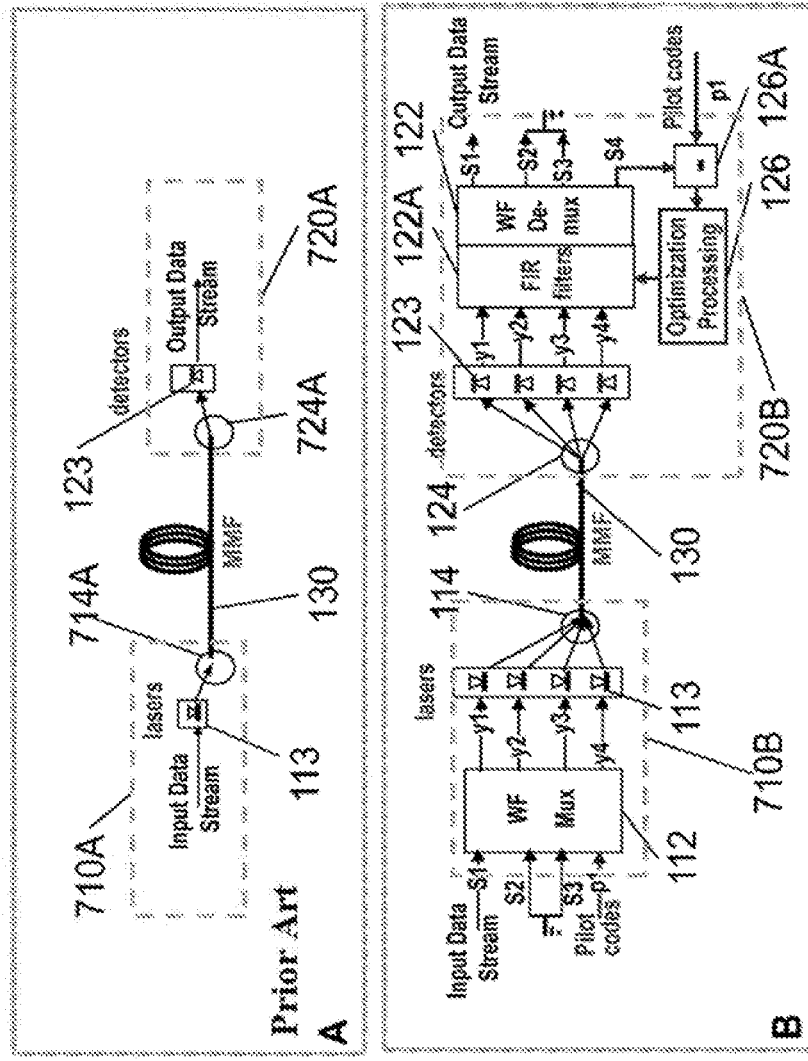
FIG. 7 illustrates power combining principles used by WF muxing/demuxing techniques in a multi-mode fiber (MMF). Panel A depicts a conventional digital data transmission using a laser source via MMF fiber. Panel B utilizes 4 unique laser sources, but only featuring a single input stream.

FIG. 7 illustrates the principle of power combining for data signal streams in an optical transmission system. There are two panels; panel (A) depicts a conventional digital data transmission using a laser source via a MMF fiber connecting a source sit 710A and a destination 720A, and panel (B) shows the same block diagram of digital data transmissions between a source site 710B and a destination 720B via a MMF fiber using 4 separated laser sources as that in FIG. 1 except there is only one input data stream.

At the source site 710A of panel A, the only input signal stream in panel A amplitude-modulates a low power laser source 113 in an optical modulator converting the electric signal stream to modulated optical signals which is launched by an optical injection device 714A exciting multiple mode groups into a MMF fiber 130. After propagating through the MMF fiber 130 through a form of multiple mode groups concurrently, the arriving signal stream is captured by an optical decoupling device 724A at the destination 720A. The received optical signal stream is converted to a received electrical signal stream by going through an optical detector 123. As a result of different propagation speeds among multiple mode groups, the received signal stream may suffer from inter-symbol interferences (ISI). Thus the effective transmission distance for the MMF fiber 130 is limited due to low power laser (attenuation effects) and high ISI potentials (dispersion effects).

Panel B illustrates a design concept featuring a multiple-mode-fiber (MMF) 130 with 400% improved optical transmission power for the same data via 4 separated mode-groups (MGs) organized by a WF muxing and demuxing processor. The WF muxing/demuxing will equalize the propagation delays, differential phases and amplitudes among multiple mode groups. The dispersion effects among the mode groups due to differential propagation speeds become diminished. Further more, the optical powers delivered by the 4 separated lasers after converted to electric signals will be "forced" via inherent equalization process and become coherent. As a result, the effective transmission distance for the MMF fiber 130 is significantly enhanced due to coherent power combining from 4 low power lasers 113 (reduced attenuation effects) and low ISI potentials (diminished dispersion effects).

A MMF transmissions source location 710 features 3 functional blocks:

(1) a WF muxing device 112 implemented by either a 4-to-4 FFT or a 4-to-4 Butler matrix, with inputs from the 3 slices and a stream of pilot codes; There are only one signal stream as s1 for input port 1 and one pilot code stream for port 4
   a. The outputs are various linear combinations of the 2 inputs; s1 and p1. Specifically, y1, y2, y3, and y4 are respectively formulated as:

$y1(t)=w11*s1(t)+w14*p1(t)$ $y2(t)=w21*s1(t)+w24*p1(t)$ $y3(t)=w31*s1(t)+w34*p1(t)$ $y4(t)=w41*s1(t)+w44*p1(t)$ b. Two wavefront (WF) vectors, each featuring 4 WF components (wfc), are defined.

$WF1=[w11,w21,w31,w41]$ $WF4=[w14,w24,w34,w44]$ c. s1(t) and ps(t) are, respectively, "attached" to the 2 WF vectors by connecting to associated input ports of the WF muxing device,
   d. the outputs y1(t), y2(t), y3(t), and y4(t) are comprised of linear combinations of wavefront components (wfcs); the aggregated wfc signal streams.
(2) 4 laser modulators 113 are excited by the 4 aggregated wfc signal streams, and
(3) a mode-group diversity multiplexing (MGDM) device 114 fed by the modulated laser lights launching 4 specific propagation mode groups in a MMF fiber 130.

Each MG features a vertical-cavity surface-emitting laser (VCSEL) 113 in transmission site and associated detector 123 on receiving (Rx) site. Four laser lights 113 modulated by digital data streams are multiplexed (muxed) via a mode-group diversity (MGD) multiplexer (muxer) 114. The muxed light signals propagate through a MMF fiber 130. At the destination, a MGD de-multiplexer (demuxer) 124 separates the 4 light signals according to their propagation mode groups.

A wavefront (WF) carrying a signal stream features a fixed propagating phase distributions among a group of (4) parallel MGs; each as an individual propagation path. Multiple orthogonal WFs can carry multiple independent signal streams concurrently from a source point to a destination point through the same group of (4) parallel paths. Concurrent propagations in the forms of orthogonal WF through multiple paths are the unique features used in the design approaches.

At a destination point 720, there are also 3 functional blocks;
(1) a MG diversity de-multiplexing (MGDM) device 124 to capture modulated lights concurrently from 4 specifically excited propagation MGs in a MMF fiber 130.
(2) 4 light de-modulators/detectors 123 to recover 4 aggregated wfc signal streams,
(3) a WF demuxing device 122 implemented by either a 4-to-4 IFFT or a 4-to-4 Butler matrix to reconstitute the 1 slice of signal stream and a stream of pilot codes;
   a. The inputs y1', y2', y3', and y4' are connected to a bank of 4 adaptive FIR filters 122A;
      (1) Individual adaptive filters compensate for phase differentials caused by Chromatic and Modal dispersions among the same MG. There will be significant reductions on waveform shape distortions; minimizing a source for inter-symbol interferences.
      (2) Differences among 4 FIR filters are optimized as a group to compensate for velocity differentials among propagating MGs via equalization of phase delays
   b. weighting coefficients of the FIR filters are optimized by control loops based on recovered pilot signals and an efficient optimization algorithm embedded in the optimization processor 126,
      (1) performance indexes are generated by a cost function generator 126A which utilizing information from both recovered pilot signals and known pilot signals;
      (2) performance indexes must be positive "definite", and can not be negative values; as a result, the associated cost function generator will feature non-linear relationships between inputs and outputs;
   c. the FIR filtered outputs become the inputs to the WF demuxer
   d. the outputs of the WF demuxer 122 are a slice of the desired signal stream and another slice of a pilot signal stream,
      (1) differences between the recovered pilot signal stream and the original are used as diagnostic observables for optimization processing 126.

Figure 8:
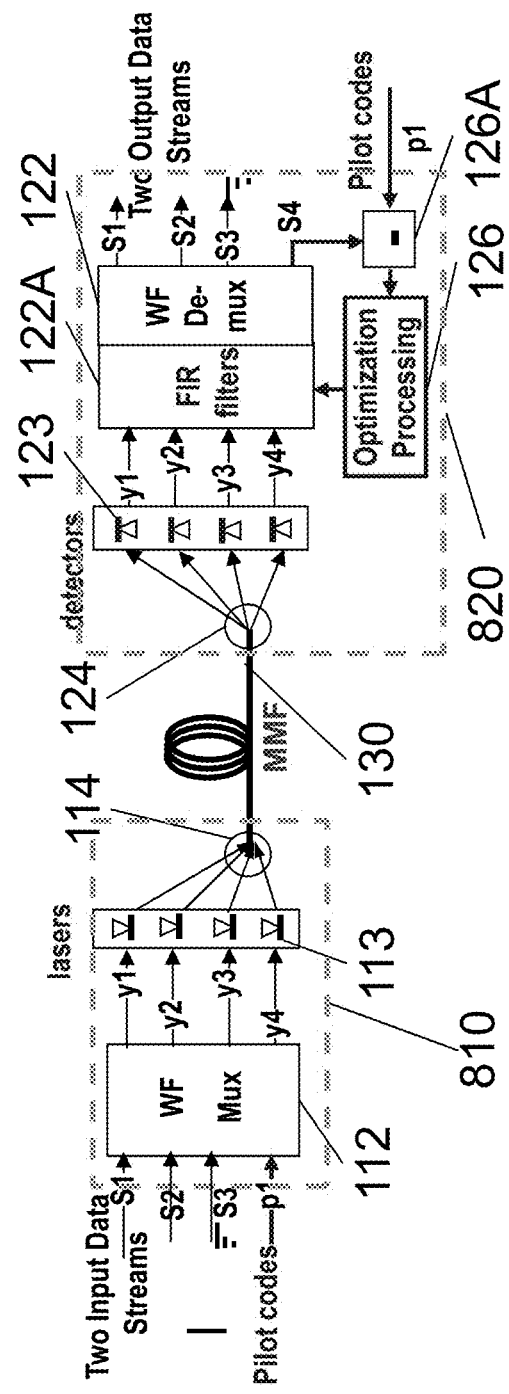
FIG. 8 illustrates dynamic resource allocation principle by WF muxing/demuxing techniques in a multi-mode fiber (MMF). It is the same block diagram of digital data transmissions via a MMF fiber using 4 separated laser sources as that in FIG. 1, except there are only two input data streams.

FIG. 8 illustrates the principle of dynamic resource allocation for two data signal streams in an optical transmission system. It shows the same block diagram of digital data transmissions between a source site 810 and a destination 820 via a MMF fiber using 4 separated laser sources as that in FIG. 1 except there are two input data stream.

The design concept features a multiple-mode-fiber (MMF) 130 with 400% improved optical transmission power for the same data via 4 separated mode-groups (MGs) organized by a WF muxing and demuxing processor through 4 separated low power lasers 113. The WF muxing/demuxing will equalize the propagation delays, differential phases and amplitudes among multiple mode groups. The dispersion effects among the mode groups due to differential propagation speeds become diminished. Further more, the optical powers delivered by the 4 separated lasers after converted to electric signals will be "forced" via inherent equalization process and become coherent. As a result, the effective transmission distance for the MMF fiber 130 is significantly enhanced due to coherent power combining from 4 low power lasers 113 (reduced attenuation effects) and low ISI potentials (diminished dispersion effects).

Since each of the lasers 113 will amplify combined signals from three signals, s1, s2, and p1, each signal can therefore access to the output powers of all three lasers. When input power levels of all three signals are identical, the output powers contributing to the three signals are also identical. On the other hand, when input power levels of s1 and s2 become 20 dB higher than that of p1 under than the constraint that the sum of all input signals are kept in a constant power level, p1 will have less than 1% power contributions at the outputs of all three lasers. Under this condition, the output power levels at the destination 820 between s1 and s2 channels after the processing of the WF muxer 112 and the WF demuxer 122 can be dynamically allocated by varying the input power levels of s1 and s2 before the WF muxer 112 at the source site 810.

It is noticed that FIG. 1, Panel B of FIG. 7, and FIG. 8 are identical except the number of utilized input signal ports of the WF muxer 112, and the associated output signal ports of the WF demuxer 122. These configurations feature a MMF fiber using WF muxing/demuxing. Similar configurations can be realized for single mode fibers using WF muxing/demuxing to enhance transmission channel capacity, power addition capability for detected signals, and dynamic resource allocations capability among multiple signal channels.

What is claimed is:

1. A system comprising:
a first processor having N first input ports and N first output ports, N being a positive integer greater than 1, for receiving concurrently N first signals at the N first input ports, performing an N-to-N wavefront multiplexing transform on the N first signals and outputting concurrently N first wavefront multiplexed signals at the N first output ports such that the N first wavefront multiplexed signals are orthogonal to one another and each of the N first wavefront multiplexed signals is a respective linear combination of the N first signals; and
a first set of optical modulators coupled to the first processor, for converting the N first wavefront multiplexed signals into first optical mode groups for transmission in a multi-mode fiber,
wherein the respective linear combination is a sum of products of the N first signals at the N first input ports and corresponding wavefront components of the N-to-N wavefront multiplexing transform.

2. The system of claim 1, wherein the N first signals comprise at least one known pilot code signal or at least one ground signal or both.

3. The system of claim 1 further comprising a time-division de-multiplexer coupled to M first input ports of the N first input ports, M being a positive integer greater than or equal to 1 and smaller than N, the time-division de-multiplexer receiving and transforming a data signal into M first signals of the N first signals.

4. The system of claim 1 further comprising:
a second processor having N second input ports and N second output ports, N being a positive integer greater than 1, for receiving concurrently N second signals at the N second input ports, performing an N-to-N wavefront multiplexing transform on the N second signals and outputting concurrently N second wavefront multiplexed signals at the N second output ports such that the N second wavefront multiplexed signals are orthogonal to one another and each of the N second wavefront multiplexed signals is a respective linear combination of the N second signals; and
a second set of optical modulators coupled to the second processor, for converting the N second wavefront multiplexed signals into second optical mode groups for transmission in the multi-mode fiber,
wherein the first and second sets of optical modulators are transmitting respectively the first and second optical mode groups simultaneously to the multi-mode fiber.

5. The system of claim 4, wherein the first optical mode groups correspond respectively to the second optical mode groups.

6. The system of claim 4, wherein the second processor and the second set of optical modulators are not located at a same site as the first processor and the first set of optical modulators.

7. The system of claim 1 further comprising:
a time-division multiplexer coupled to the N first outputs, for multiplexing the N first wavefront multiplexed signals into L multiplexed signals, L being a positive integer smaller than N, and for outputting the L multiplexed signals to the first set of optical modulators.

8. A system comprising:
a set of optical demodulators for receiving optical mode groups from a multi-mode fiber and converting the optical mode groups into electrical signals;
a bank of adaptive filters coupled to the set of optical demodulators, for filtering the electrical signals and outputting concurrently N filtered signals, N being a positive integer greater than 1; and
a first processor coupled to the bank of adaptive filters, the processor having N input ports and N output ports, receiving concurrently the N filtered signals at the N input ports, performing an N-to-N wavefront demultiplexing transform on the N filtered signals and outputting concurrently N wavefront demultiplexed signals at the N output ports such that the N wavefront demultiplexed signals are orthogonal to one another and each of the N wavefront demultiplexed signals is a respective linear combination of the N filtered signals;
wherein the N filtered signals correspond to N signals that result from performing an N-to-N wavefront multiplexing transform on a set of input signals at a transmitting site, and wherein the N-to-N wavefront demultiplexing transform is an inverse of the N-to-N wavefront multiplexing transform, and
wherein the respective linear combination is a sum of products of the N filtered signals at the N input ports and corresponding wavefront components of the N-to-N wavefront demultiplexing transform.

9. The system of claim 8, wherein the set of input signals comprises at least one known pilot code signal and wherein at least one of the N wavefront demultiplexed signals comprises a corresponding at least one recovered pilot code signal.

10. The system of claim 9 further comprising an optimization processor coupled to the bank of adaptive filters for dynamically modifying coefficients of the adaptive filters such that differences between the at least one recovered pilot code signal and the at least one known pilot code signal are minimized.

11. The system of claim 8 further comprising a time-division multiplexer coupled to the first processor for combining some of the N wavefront demultiplexed signals into a recovered signal.

12. The system of claim 8 further comprising:
a mode-group diversity de-multiplexer coupled to the set of optical de-modulators to de-multiplex the optical mode groups.

13. The system of claim 8 further comprising a signal de-multiplexer coupled to one of the N output ports of the first processor to receive and demultiplex a respective one of the N wavefront demultiplexed signals into a second recovered signal and a recovered pilot code signal.

14. The system of claim 9 further comprising a cost function generator coupled to the first processor and to the optimization processor for generating performance indexes based on the at least one recovered pilot code signal and the at least one known pilot code signal, and outputting the performance indexes to the optimization processor.

15. A system comprising:
a time-division de-multiplexer for converting a first data stream into a set of concurrent first data signals;
a signal multiplexer for converting a second data stream and at least one pilot code signal into a second data signal; and a processor coupled to the time-division de-multiplexer and the signal multiplexer, the processor having N input ports and N output ports, N being a positive integer greater than 1, for receiving concurrently N input signals at the N input ports, the N input signals including the concurrent first data signals and the second data signal, performing an N-to-N wavefront multiplexing transform on the N input signals and outputting concurrently N wavefront multiplexed signals at the N output ports such that the N wavefront multiplexed signals are orthogonal to one another and each of the N wavefront multiplexed signals is a respective linear combination of the N input signals; and a set of optical modulators coupled to the processor, for converting the N wavefront multiplexed signals into optical mode groups for transmission in a multi-mode fiber, wherein the respective linear combination is a sum of products of the N input signals at the N input ports and corresponding wavefront components of the N-to-N wavefront multiplexing transform.

16. The system of claim 15, wherein some of the N input ports are grounded.

17. The system of claim 15, wherein the set of optical modulators comprises:
at least one dual-polarization quadrature phase-shift-key modulator coupled to the N output ports of the processor for receiving the N wavefront multiplexed signals and outputting optical data streams.

18. The system of claim 1 further comprising:
a mode-group diversity multiplexer coupled to the first set of optical modulators to multiplex the first optical mode groups for transmission in the multi-mode fiber.

19. The system of claim 12, wherein the set of optical demodulators comprises:
at least one dual-polarization quadrature phase-shift-key demodulator coupled to the mode-group diversity de-multiplexer and outputting the electrical signals to the bank of adaptive filters.

20. The system of claim 15 further comprising:
a mode-group diversity multiplexer coupled to the set of optical modulators to multiplex the optical mode groups for transmission in the multi-mode fiber.

* * * * *